United States Patent
Park et al.

(10) Patent No.: US 12,471,160 B2
(45) Date of Patent: Nov. 11, 2025

(54) METHOD AND APPARATUS FOR PERFORMING RADIO COMMUNICATION RELATED TO MAC RESET IN NR V2X

(71) Applicant: LG ELECTRONICS INC., Seoul (KR)

(72) Inventors: Giwon Park, Seoul (KR); Seungmin Lee, Seoul (KR); Seoyoung Back, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 383 days.

(21) Appl. No.: 18/140,166

(22) Filed: Apr. 27, 2023

(65) Prior Publication Data

US 2023/0354448 A1    Nov. 2, 2023

Related U.S. Application Data

(60) Provisional application No. 63/336,300, filed on Apr. 28, 2022.

(30) Foreign Application Priority Data

Apr. 20, 2023    (KR) .................. 10-2023-0052240

(51) Int. Cl.
  *H04W 76/14*    (2018.01)
  *H04W 76/28*    (2018.01)
  *H04W 92/18*    (2009.01)

(52) U.S. Cl.
  CPC .......... *H04W 76/14* (2018.02); *H04W 76/28* (2018.02); *H04W 92/18* (2013.01)

(58) Field of Classification Search
  CPC ..... H04W 76/14; H04W 76/23; H04W 76/28; H04W 92/18
  See application file for complete search history.

(56) References Cited

U.S. PATENT DOCUMENTS

2022/0346180 A1* 10/2022  Tseng .................... H04W 76/14
2023/0156857 A1*  5/2023  Hong ................... H04W 52/028
                                                370/328

FOREIGN PATENT DOCUMENTS

EP       3780887 A1    2/2021
WO   2021/206494 A1   10/2021

OTHER PUBLICATIONS

LG Electronic Inc., Report of [Post109bis-e][957][V2X]: MAC issues (LG), 3GPP TSG-RAN WG2 #110-e, R2-2005720, Online, Jun. 1-12, 2020.

(Continued)

Primary Examiner — Thomas R Cairns
(74) Attorney, Agent, or Firm — BRYAN CAVE LEIGHTON PAISNER LLP

(57) ABSTRACT

A method for performing wireless communication by a first device and an apparatus supporting the same are proposed. For example, the first device may obtain an SL DRX configuration including information related to an SL DRX cycle and information related to a timer for active time. For example, the timer for active time may include at least one of an SL DRX on-duration timer or an SL DRX inactivity timer. For example, the first device may trigger SL DRX command MAC CE reporting related to the PC5-RRC connection. For example, the first device may cancel the triggered SL DRX command MAC CE reporting, based on an MAC reset for the PC5-RRC connection being requested.

20 Claims, 24 Drawing Sheets

(56) References Cited

OTHER PUBLICATIONS

ASUSTek, "Discussion on SL MAC aspects", 3gPP TSG-RAN WG2 Meeting #118 electronic, R2-2205136, Online, May 9-20, 2022.

* cited by examiner (a)      (b)      (c)

● : TX UE
◎ : RX UE

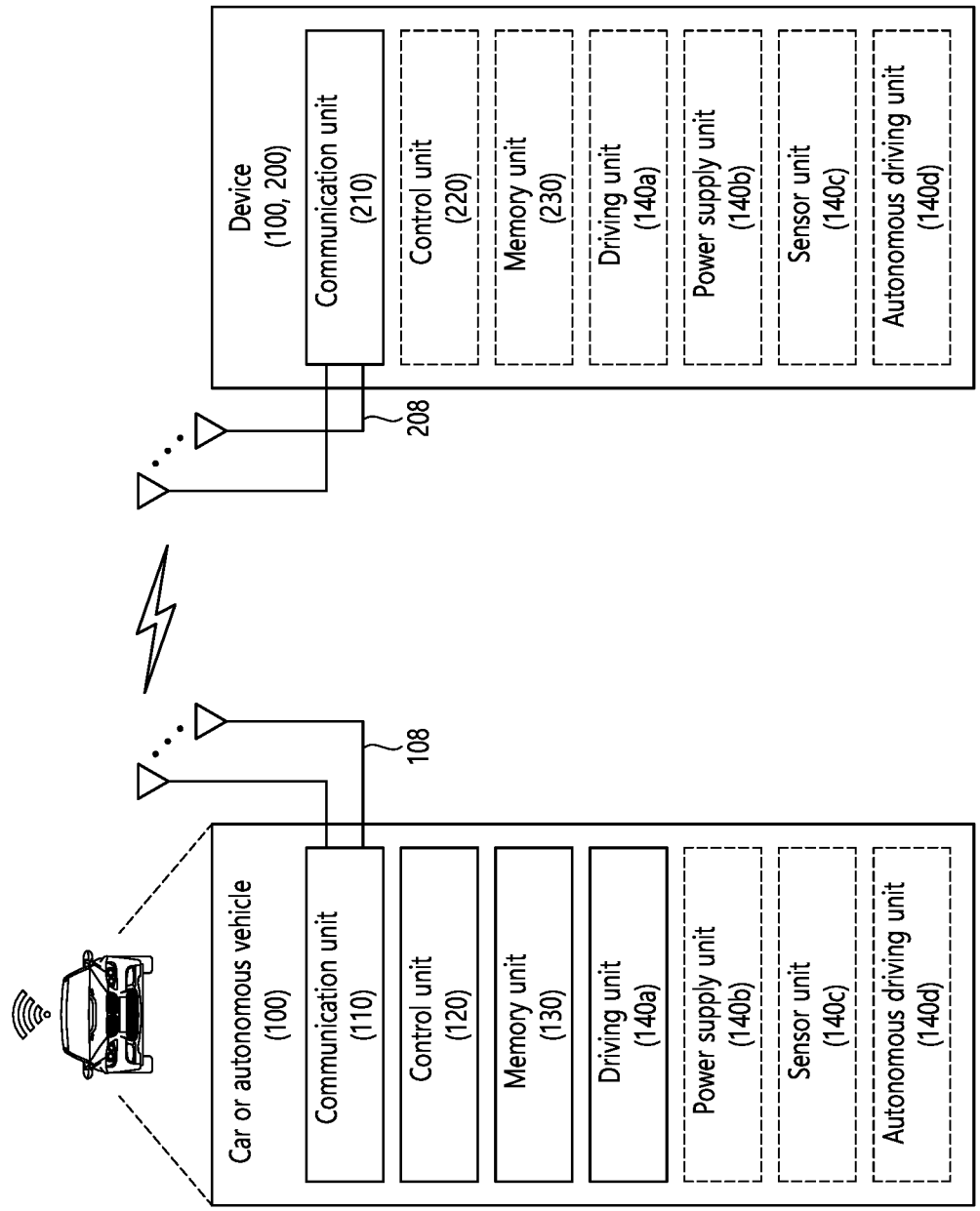

METHOD AND APPARATUS FOR PERFORMING RADIO COMMUNICATION RELATED TO MAC RESET IN NR V2X

CROSS-REFERENCE TO RELATED APPLICATIONS

This application claims the benefit of U.S. Provisional Application No. 63/336,300, filed on Apr. 28, 2022, and Korean Application No. 10-2023-0052240, filed on Apr. 20, 2023, the contents of which are all hereby incorporated by reference herein in its entirety.

BACKGROUND

Field

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an entity having an infrastructure (or infra) established therein, and so on. The V2X may be spread into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

For example, a MAC reset may include at least one of a Uu interface MAC reset and a sidelink interface MAC reset (e.g., a MAC reset related to a PC5-RRC connection). For example, when a UE receives a request for a sidelink interface MAC reset and the UE is running a DRX timer, the UE may stop the DRX timer. For example, the DRX timer may include a timer for active time. For example, when the UE receives a request for a sidelink interface MAC reset and the UE is running a DRX timer, the UE may stop monitoring PSCCH/PSSCH.

Meanwhile, for example, if the UE receives a DRX command MAC CE (e.g., a long DRX command MAC CE), the UE may stop the DRX timer (e.g., a DRX on-duration timer, a DRX inactivity timer). By the way, for example, even if the UE receives a request for a sidelink interface MAC reset, a DRX command MAC CE may be unnecessarily generated and/or signaled. For example, if a DRX command CE is included in a MAC PDU, a MAC PDU containing a DRX command MAC CE may be unnecessarily generated and/or signaled even if the UE receives a request for a sidelink interface MAC reset. And, for example, even if a sidelink interface MAC reset is generated, the UE may unnecessarily additionally receive a DRX command MAC CE, and the UE may unnecessarily additionally stop the DRX timer.

In one embodiment, there is provided a method for performing wireless communication by a first device. The first device may establish a PC5-RRC connection with a second device. For example, the first device may obtain an SL DRX configuration including information related to an SL DRX cycle and information related to a timer for active time. For example, the timer for active time may include at least one of an SL DRX on-duration timer or an SL DRX inactivity timer. For example, a time during which the SL DRX on-duration timer is running or a time during which the SL DRX inactivity timer is running may be a time included in an active time of the second device. For example, the first device may trigger SL DRX command MAC CE reporting related to the PC5-RRC connection. For example, the first device may cancel the triggered SL DRX command MAC CE reporting, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second device from monitoring PSCCH before the next SL DRX cycle.

In an embodiment, there is provided a first device for performing wireless communication. The first device may include: one or more memories storing instructions; one or more transceivers; and one or more processors connected to the one or more memories and the one or more transceivers, wherein the one or more processors may execute the instructions to establish a PC5-RRC (radio resource control) connection with a second device. For example, the one or more processors may execute the instructions to obtain an SL DRX configuration including information related to an SL (sidelink) DRX (discontinuous) cycle and information related to a timer for active time. For example, the timer for active time may be at least one of an on-duration timer or an SL DRX inactivity timer. For example, a time during which the SL DRX on-duration timer is running or a time during which the SL DRX inactivity timer is running may be a time included in an active time of the second device. For example, the one or more processors may execute the instructions to trigger SL DRX command MAC (medium access control) CE (control element) reporting related to the PC5-RRC connection. For example, the one or more processors may execute the instructions to cancel the triggered SL DRX command MAC CE reporting, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second device from monitoring PSCCH (physical sidelink control channel) before the next SL DRX cycle.

In an embodiment, there is provided an apparatus configured to control a first UE. The apparatus may include: one or more processors; and one or more memories that are operably connected by the one or more processors and store instructions, wherein the one or more processors may execute the instructions to establish a PC5-RRC (radio resource control) connection with a second UE. For example, the one or more processors may execute the instructions to obtain an SL DRX configuration including information related to an SL (sidelink) DRX (discontinuous) cycle and information related to a timer for active time. For example, the timer for active time may be at least one of an on-duration timer or an SL DRX inactivity timer. For example, a time during which the SL DRX on-duration timer is running or a time during which the SL DRX inactivity timer is running may be a time included in an active time of the second UE. For example, the one or more processors may execute the instructions to trigger SL DRX command MAC (medium access control) CE (control element) reporting related to the PC5-RRC connection. For example, the one or more processors may execute the instructions to cancel the triggered SL DRX command MAC CE reporting, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second UE from monitoring PSCCH (physical sidelink control channel) before the next SL DRX cycle.

In an embodiment, there is provided a non-transitory computer-readable storage medium that stores instructions. When the instructions are executed by one or more processors, the one or more processors cause a first device to establish a PC5-RRC (radio resource control) connection with a second device. For example, when the instructions are executed by one or more processors, the one or more processors cause the first device to obtain an SL DRX configuration including information related to an SL (sidelink) DRX (discontinuous) cycle and information related to a timer for active time. For example, the timer for active time may be at least one of an on-duration timer or an SL DRX inactivity timer. For example, a time during which the SL DRX on-duration timer is running or a time during which the SL DRX inactivity timer is running may be a time included in an active time of the second device. For example, when the instructions are executed by one or more processors, the one or more processors may cause the first device to trigger SL DRX command MAC (medium access control) CE (control element) reporting related to the PC5-RRC connection. For example, when the instructions are executed by one or more processors, the one or more processors may cause the first device to cancel the triggered SL DRX command MAC CE reporting, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second device from monitoring PSCCH (physical sidelink control channel) before the next SL DRX cycle.

In an embodiment, there is provided a method for performing wireless communication by a second device. The second device may establish a PC5-RRC connection with a first device. For example, the second device may obtain an SL DRX configuration including information related to an SL DRX cycle and information related to a timer for active time. For example, the timer for active time may include at least one of an SL DRX on-duration timer or an SL DRX inactivity timer. For example, a time during which the SL DRX on-duration timer is running or a time during which the SL DRX inactivity timer is running may be a time included in an active time of the second device. For example, SL DRX command MAC (medium access control) CE (control element) reporting related to the PC5-RRC connection may be triggered. For example, the triggered SL DRX command MAC CE reporting may be canceled, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second device from monitoring PSCCH before the next SL DRX cycle.

In an embodiment, there is provided a second device for performing wireless communication. The second device may include: one or more memories storing instructions; one or more transceivers; and one or more processors connected to the one or more memories and the one or more transceivers, wherein the one or more processors may execute the instructions to establish a PC5-RRC (radio resource control) connection with a first device. For example, the one or more processors may execute the instructions to obtain an SL DRX configuration including information related to an SL (sidelink) DRX (discontinuous) cycle and information related to a timer for active time. For example, the timer for active time may include at least one of an on-duration timer or an SL DRX inactivity timer. For example, a time during which the SL DRX on-duration timer is running or a time during which the SL DRX inactivity timer is running may be a time included in an active time of the second device. For example, SL DRX command MAC (medium access control) CE (control element) reporting related to the PC5-RRC connection may be triggered. For example, the triggered SL DRX command MAC CE reporting may be canceled, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second device from monitoring PSCCH (physical sidelink control channel) before the next SL DRX cycle.

In an embodiment, there is provided an apparatus configured to control a second UE. The apparatus may include: one or more processors; and one or more memories that are operably connected by the one or more processors and store instructions, wherein the one or more processors may execute the instructions to establish a PC5-RRC (radio resource control) connection with a first UE. For example, the one or more processors may execute the instructions to obtain an SL DRX configuration including information related to an SL (sidelink) DRX (discontinuous) cycle and information related to a timer for active time. For example, the timer for active time may include at least one of an on-duration timer or an SL DRX inactivity timer. For example, a time during which the SL DRX on-duration timer is running or a time during which the SL DRX inactivity timer is running may be a time included in an active time of the second UE. For example, SL DRX command MAC (medium access control) CE (control element) reporting related to the PC5-RRC connection may be triggered. For example, the triggered SL DRX command MAC CE reporting may be canceled, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second UE from monitoring PSCCH (physical sidelink control channel) before the next SL DRX cycle.

In an embodiment, there is provided a non-transitory computer-readable storage medium that stores instructions. When the instructions are executed by one or more processors, the one or more processors may cause a second device to establish a PC5-RRC (radio resource control) connection. For example, when the instructions are executed by one or more processors, the one or more processors may cause the second device to obtain an SL DRX configuration including information related to an SL (sidelink) DRX (discontinuous) cycle and information related to a timer for active time. For example, the timer for active time may include at least one of an on-duration timer or an SL DRX inactivity timer. For example, a time during which the SL DRX on-duration timer is running or a time during which the SL DRX inactivity timer is running may be a time included in an active time of the second device. For example, SL DRX command MAC (medium access control) CE (control element) reporting related to the PC5-RRC connection may be triggered. For example, the triggered SL DRX command MAC CE reporting may be canceled, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second device from monitoring PSCCH (physical sidelink control channel) before the next SL DRX cycle.

A UE can efficiently perform sidelink communication.

BRIEF DESCRIPTION OF THE DRAWINGS

FIG. 24 shows a vehicle or an autonomous vehicle, based on an embodiment of the present disclosure.

DESCRIPTION OF EXEMPLARY EMBODIMENTS

Figure 1:
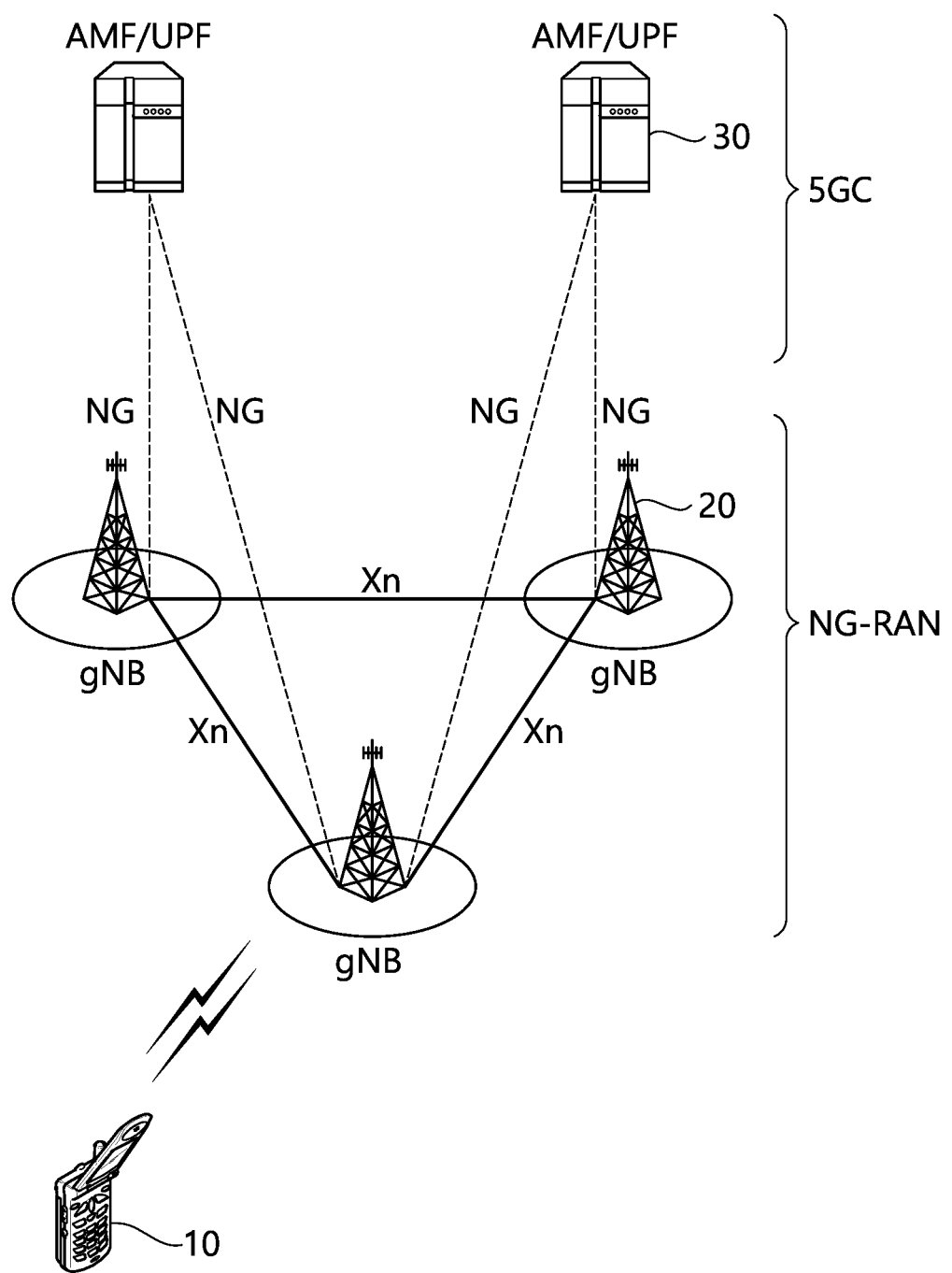
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
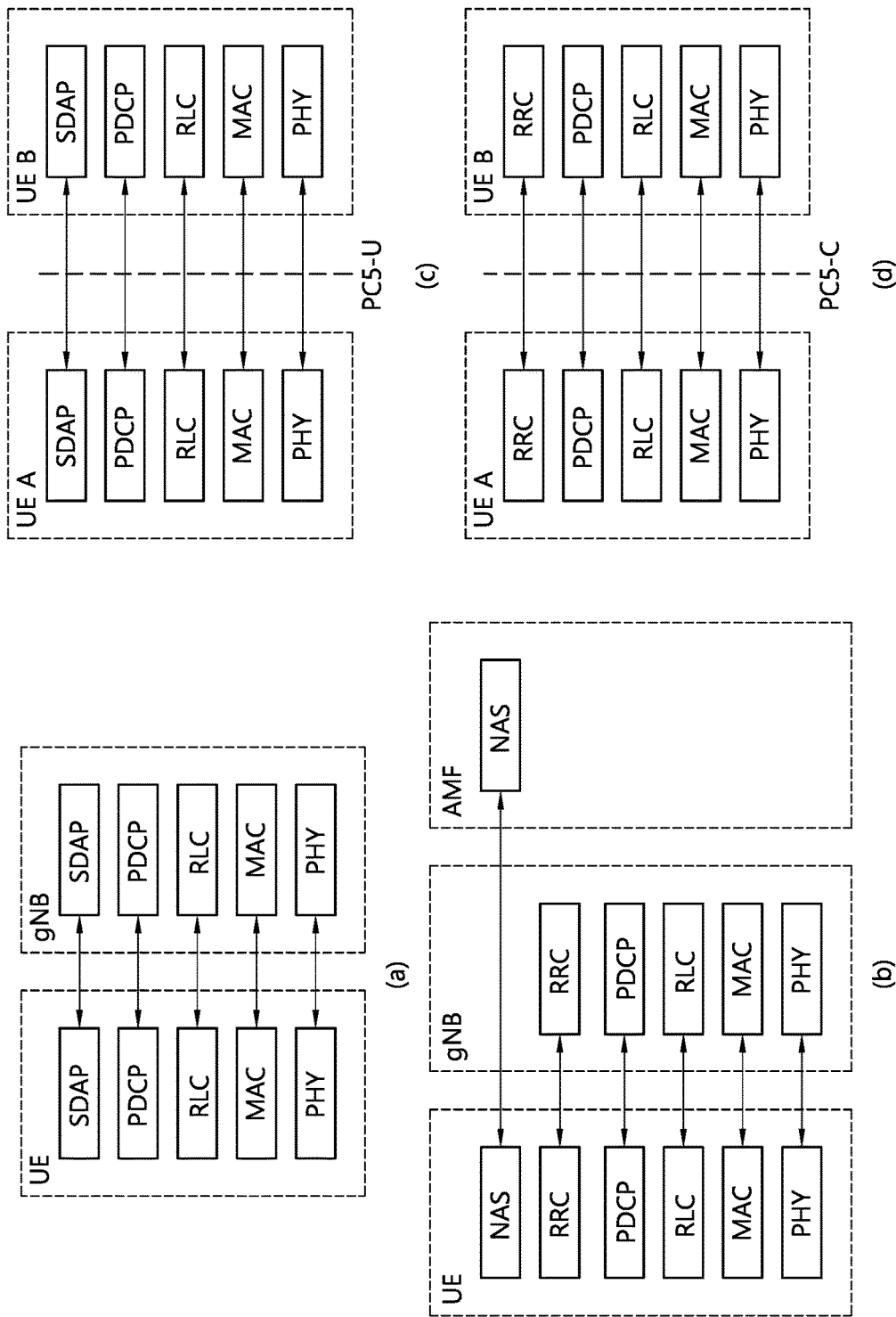
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QOS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QOS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
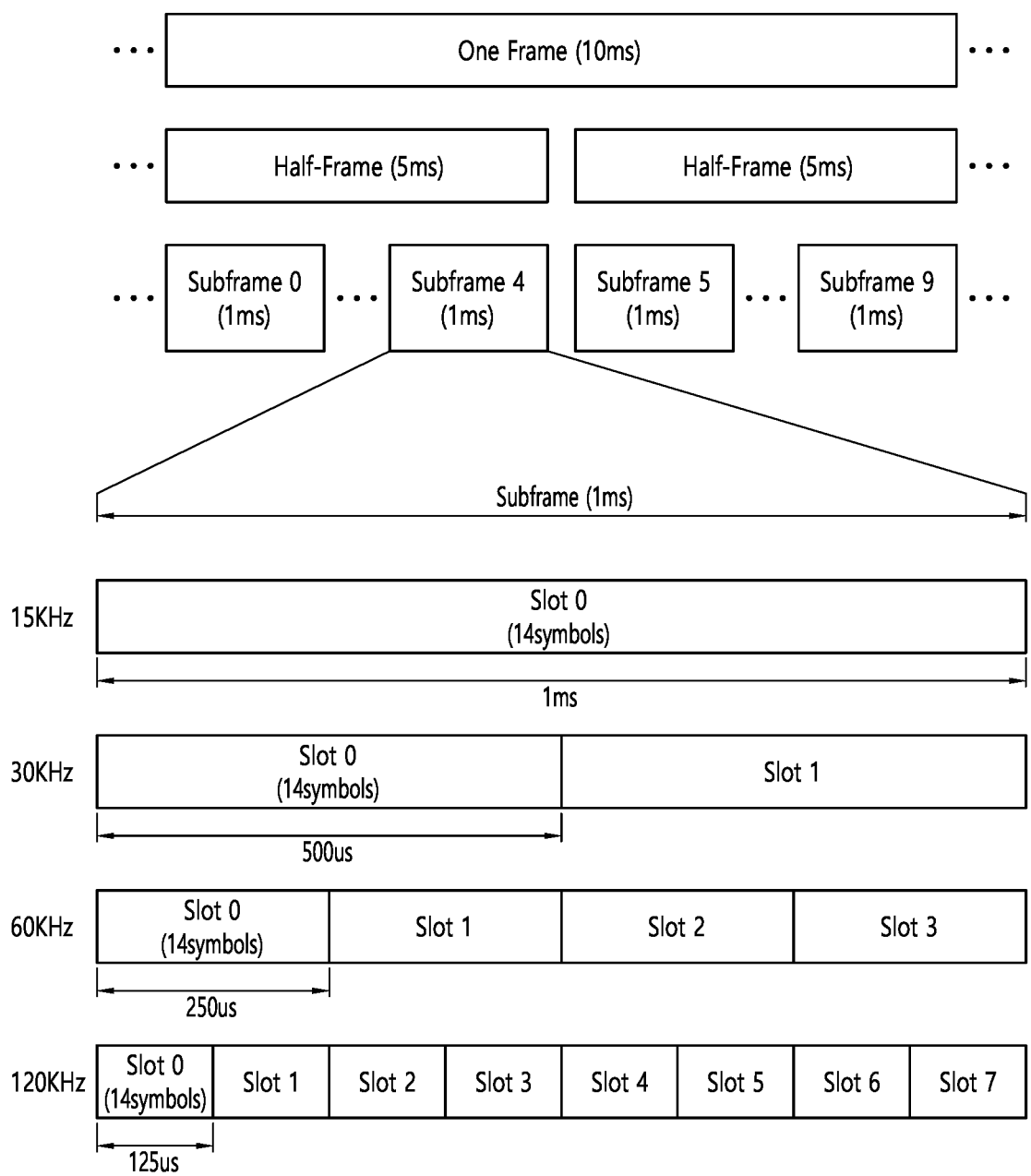
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM (A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM (A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
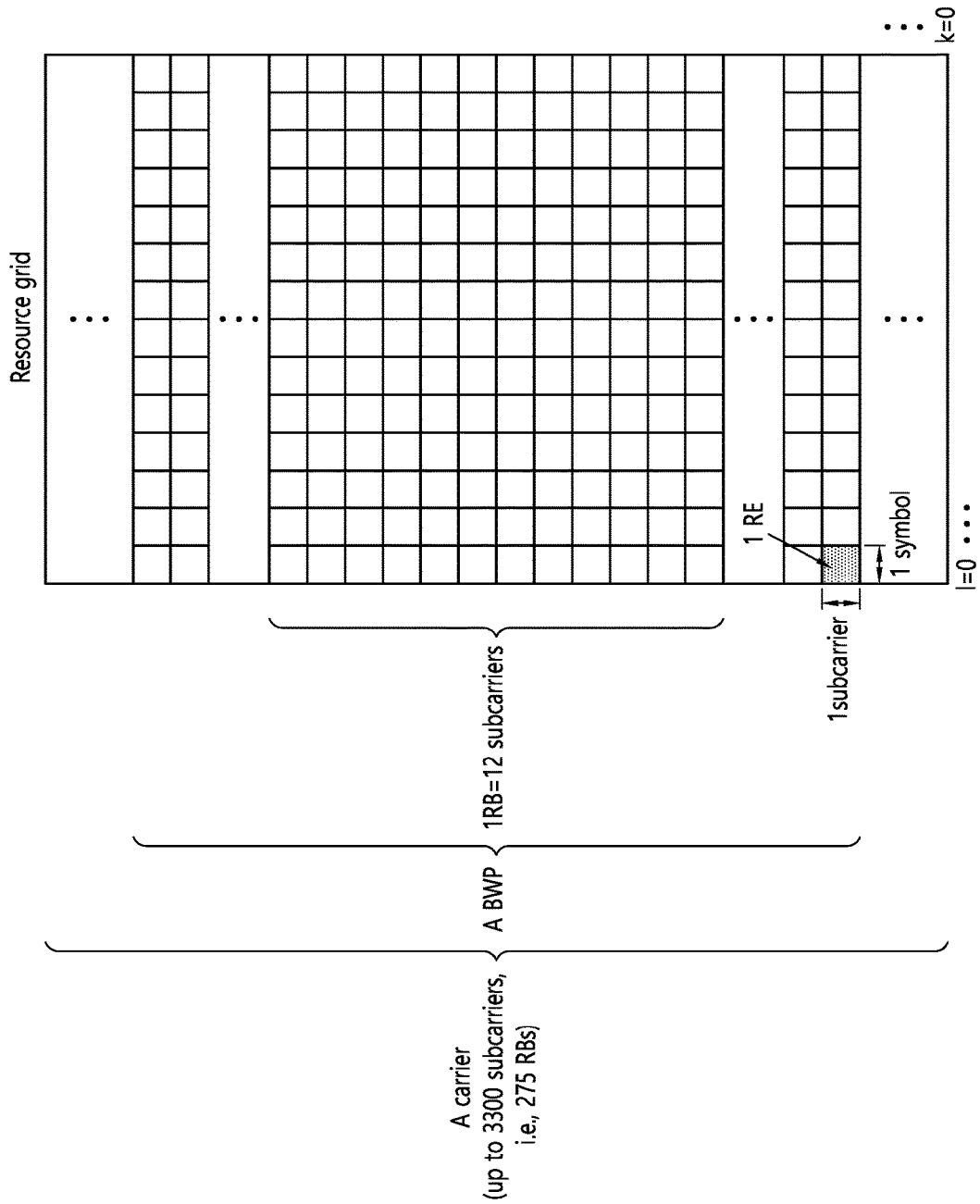
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-) configured in a carrier with respect to an out-of-coverage NR V2X UE and an RRC_IDLE UE. For the UE in the RRC_CONNECTED mode, at least one SL BWP may be activated in the carrier.

Figure 5:
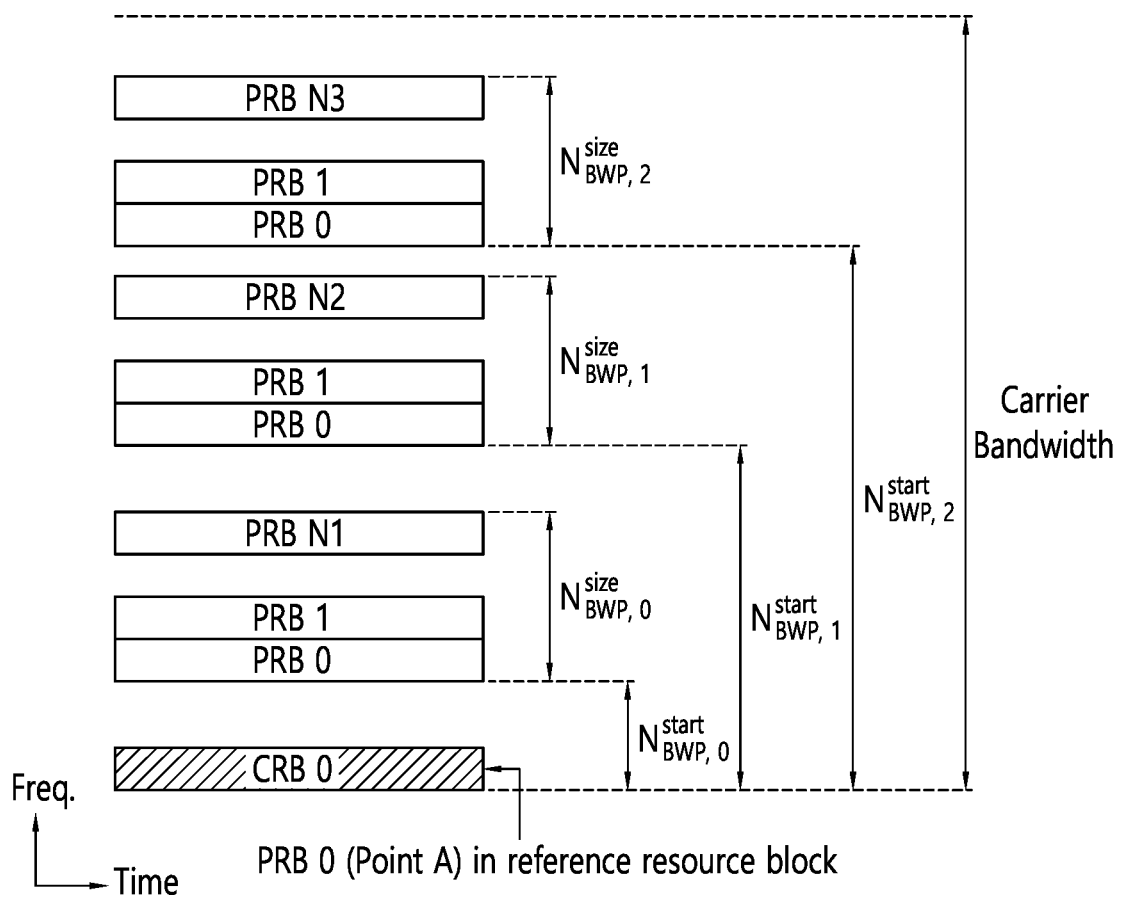
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-) configured. Accordingly, the UE does not have to perform hypothesis detection at frequency to discover the S-SSB in the carrier.

Figure 6:
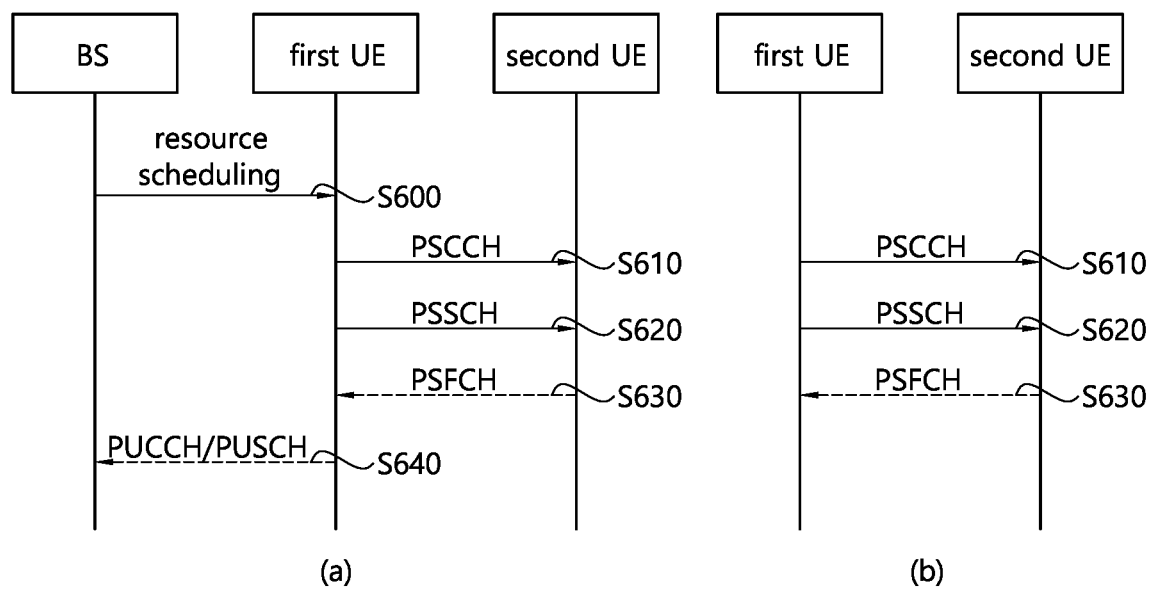
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re) selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority-3 bits

Frequency resource assignment-ceiling ($\log_2$ ($N^{SL}_{subChannel}(N^{SL}_{subChannel}+1)/2$)) bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment-5 bits when the value of the higher layer parameter sl-MaxNumPerReserve is configured to 2; otherwise 9 bits when the value of the higher layer parameter sl-MaxNumPerReserve is configured to 3

Resource reservation period-ceiling ($\log_2 N_{rsv\_period}$) bits, where $N_{rsv\_period}$ is the number of entries in the higher layer parameter sl-ResourceReservePeriodList, if higher layer parameter sl-MultiReserveResource is configured; 0 bit otherwise DMRS pattern-ceiling ($\log_2 N_{pattern}$) bits, where $N_{pattern}$ is the number of DMRS patterns configured by higher layer parameter sl-PSSCH-DMRS-TimePatternList $2^{nd}$-stage SCI format-2 bits as defined in Table 5

Beta_offset indicator-2 bits as provided by higher layer parameter sl-BetaOffsets2ndSCI Number of DMRS port-1 bit as defined in Table 6

Modulation and coding scheme-5 bits

Additional MCS table indicator-1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication-1 bit if higher layer parameter sl-PSFCH-Period=2 or 4; 0 bit otherwise Reserved-a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number-4 bits
New data indicator-1 bit
Redundancy version-2 bits
Source ID-8 bits
Destination ID-16 bits
HARQ feedback enabled/disabled indicator-1 bit
Cast type indicator-2 bits as defined in Table 7
CSI request-1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number-4 bits
New data indicator-1 bit
Redundancy version-2 bits
Source ID-8 bits
Destination ID-16 bits
HARQ feedback enabled/disabled indicator-1 bit
Zone ID-12 bits
Communication range requirement-4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
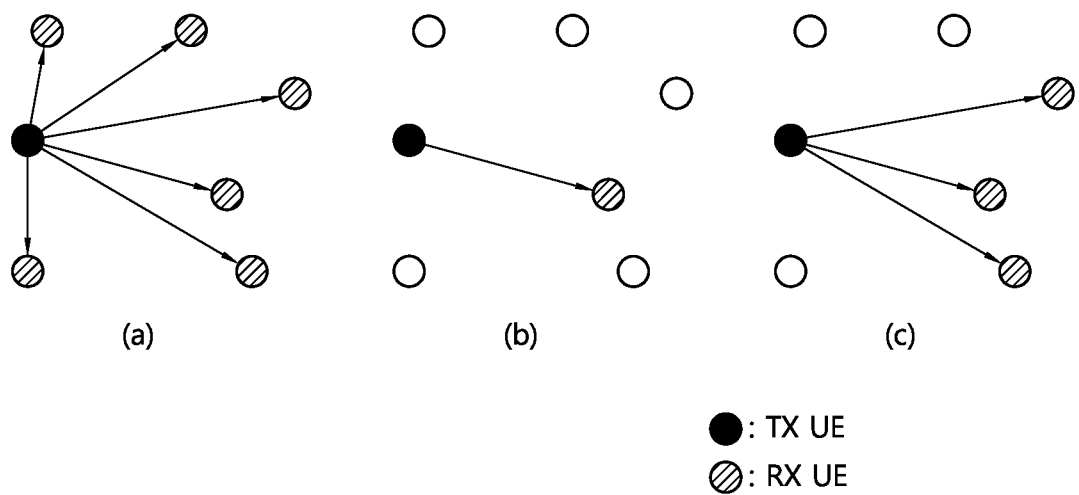
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

In the present disclosure, HARQ-ACK may be referred to as ACK, ACK information, or positive-ACK information, and HARQ-NACK may be referred to as NACK, NACK information, or negative-ACK information.

An SL DRX configuration referred to in this disclosure may include at least one or more of the following parameters.

For example, an SL DRX configuration may include one or more of the information listed below.

(1) For example, SL drx-onDurationTimer may be information on the duration at the beginning of a DRX Cycle. For example, a start period of a DRX cycle may be information on a period in which a terminal operates in an active mode to transmit or receive sidelink data.

(2) For example, SL drx-SlotOffset may be information on a delay before starting a drx-onDurationTimer of a DRX-on duration timer.

(3) For example, SL drx-InactivityTimer may be information on the duration after the PSCCH occasion in which a PSCCH indicates a new sidelink transmission and reception for the MAC entity. For example, when a transmitting terminal instructs PSSCH transmission through a PSCCH, the transmitting terminal operates in an active mode while an SL drx-InactivityTimer is running, so that the transmitting terminal may transmit PSSCH to a receiving terminal. Also, for example, when a receiving terminal is instructed that a transmitting terminal transmits a PSSCH through PSCCH reception, the receiving terminal operates in an active mode while SL drx-InactivityTimer is running, so that the receiving terminal may receive the PSSCH from the transmitting terminal.

(4) For example, SL drx-RetransmissionTimer may be information on the maximum duration until a retransmission is received. For example, SL drx-RetransmissionTimer may be configured per HARQ process.

(5) For example, SL drx-HARQ-RTT-Timer may be information on the minimum duration before an assignment for HARQ retransmission is expected by the MAC entity. For example, SL drx-HARQ-RTT-Timer may be configured per HARQ process.

(6) For example, SL drx-LongCycleStartOffset may be information on the Long DRX cycle and drx-StartOffset which defines the subframe where the Long and Short DRX Cycle starts.

(7) For example, SL drx-ShortCycle may be information on the Short DRX cycle. For example, SL drx-ShortCycle may be optional information.

(8) For example, SL drx-ShortCycleTimer may be information on the duration a UE shall follow the Short DRX cycle. For example, SL drx-ShortCycleTimer may be optional information.

(9) For example, SL drx-StartOffset may be information about the subframe where the SL DRX cycle starts.

(10) For example, SL drx-Cycle may be information about the SL DRX cycle.

The following SL DRX timer mentioned in this disclosure may be used for the following purposes.

(1) SL DRX on-duration timer: A period in which a UE performing an SL DRX operation should basically operate in an active time to receive a counterpart UE's PSCCH/PSSCH.

(2) SL DRX inactivity timer: A period in which a UE performing an SL DRX operation extends an SL DRX on-duration period, which is a period in which an active time is basically required to receive PSCCH/PSSCH of a counterpart UE.

For example, a UE may extend an SL DRX on-duration timer by an SL DRX inactivity timer period. Also, when a UE receives a new packet (e.g., new PSSCH transmission) from a counterpart UE, the UE may start an SL DRX inactivity timer to extend the SL DRX on-duration timer.

For example, an SL DRX inactivity timer may be used to extend an SL DRX duration timer period, which is a period in which an RX UE performing an SL DRX operation should basically operate as an active time to receive a PSCCH/PSSCH of the other TX UE. That is, an SL DRX on-duration timer may be extended by an SL DRX inactivity timer period. In addition, when an RX UE receives a new packet (e.g., new PSSCH transmission) from a counterpart TX UE, the RX UE may start an SL DRX inactivity timer to extend the SL DRX on-duration timer.

(3) SL DRX HARQ RTT timer: A period in which a UE performing an SL DRX operation operates in a sleep mode until it receives a retransmission packet (or PSSCH assignment) transmitted by a counterpart UE.

For example, when a UE starts an SL DRX HARQ RTT timer, the UE may determine that a counterpart UE will not transmit a sidelink retransmission packet to it until the SL DRX HARQ RTT timer expires, and may operate in a sleep mode while the corresponding timer is running. For example, when a UE starts an SL DRX HARQ RTT timer, the UE may not monitor sidelink retransmission packets from a counterpart UE until the SL DRX HARQ RTT timer expires. For example, when an RX UE that has received a PSCCH/PSSCH transmitted by a TX UE transmits SL HARQ NACK feedback, the RX UE may start an SL DRX HARQ RTT timer. In this case, an RX UE may determine that a counterpart TX UE will not transmit a sidelink retransmission packet to it until an SL DRX HARQ RTT timer expires, and the RX UE may operate in a sleep mode while the corresponding timer is running.

(4) SL DRX retransmission timer: A timer that starts when an SL DRX HARQ RTT timer expires, and a period in which a UE performing SL DRX operation operates as an active time to receive a retransmission packet (or PSSCH assignment) transmitted by a counterpart UE.

For example, during the corresponding timer period, a UE may receive or monitor a retransmission sidelink packet (or PSSCH assignment) transmitted by a counterpart UE. For example, an RX UE may receive or monitor a retransmission sidelink packet (or PSSCH assignment) transmitted by a counterpart TX UE while an SL DRX retransmission timer is running.

The following Uu DRX timer mentioned in this disclosure may be used for the following purposes.

(1) Uu DRX HARQ RTT TimerSL

For example, Uu DRX HARQ RTT TimerSL may be used in a period in which a UE performing Uu DRX operation does not need to monitor DCI (PDCCH) for SL Mode 1 operation transmitted by a base station. That is, while a Uu DRX HARQ RTT TimerSL is running, a UE may not need to monitor a PDCCH for an SL Mode 1 operation.

(2) Uu DRX Retransmission TimerSL

For example, it may be used in a period in which a UE performing Uu DRX operation monitors DCI (PDCCH) for SL Mode 1 operation transmitted by a base station. That is, while a Uu DRX Retransmission TimerSL is running, a UE may monitor a PDCCH transmitted by a base station for an SL Mode 1 operation.

In the present disclosure, names of timers (Sidelink DRX Onduration Timer, Sidelink DRX Inactivity Timer, Sidelink DRX HARQ RTT Timer, Sidelink DRX Retransmission Timer, Uu DRX HARQ RTT TimerSL, Uu DRX Retransmission TimerSL, etc.) are exemplary, and timers that perform the same/similar functions based on content described in each timer may be regarded as the same/similar timers regardless of their names.

Meanwhile, according to an embodiment of the present disclosure, in an SL DRX operation, as is the case with Uu, an SL DRX command MAC (medium access control) CE (control element) and/or an SL long DRX command MAC CE may be supported. For example, if an RX UE receives an SL DRX command MAC CE from a TX UE, the RX UE may stop the onduration timer and/or the inactivity timer and perform a DRX operation based on a long DRX cycle (or a short DRX cycle if configured). For example, if an RX UE receives an SL long DRX command MAC CE from a TX UE, the RX UE may stop a short cycle timer and perform a DRX operation based on a long DRX cycle. For example, the RX UE may perform PSCCH monitoring while the on-duration timer or the inactivity timer is running.

Hereinafter, a wireless communication system supporting an unlicensed band/shared spectrum will be described.

Figure 8:
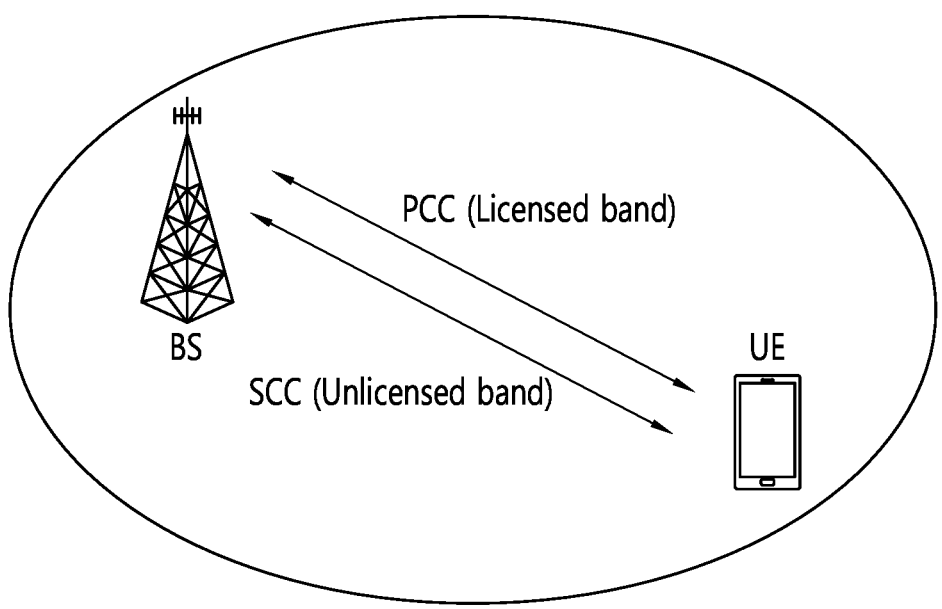
FIG. 8 shows an example of a wireless communication system supporting an unlicensed band, based on an embodiment of the present disclosure.
Figure 9:
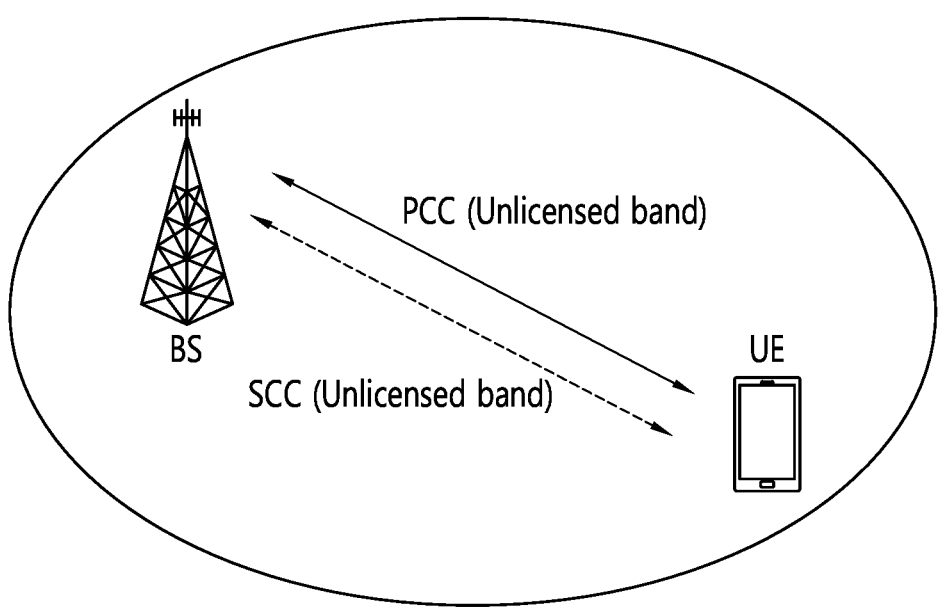
FIG. 9 shows an example of a wireless communication system supporting an unlicensed band, based on an embodiment of the present disclosure.

FIG. 8 and FIG. 9 shows an example of a wireless communication system supporting an unlicensed band, based on an embodiment of the present disclosure. For example, FIG. 8 and FIG. 9 may include an unlicensed spectrum (NR-U) wireless communication system. The embodiment of FIG. 8 and FIG. 9 may be combined with various embodiments of the present disclosure.

In the following description, a cell operating in a licensed band (hereinafter, L-band) may be defined as an L-cell, and a carrier of the L-cell may be defined as a (DL/UL/SL) LCC. In addition, a cell operating in an unlicensed band (hereinafter, U-band) may be defined as a U-cell, and a carrier of the U-cell may be defined as a (DL/UL/SL) UCC. The carrier/carrier-frequency of a cell may refer to the operating frequency (e.g., center frequency) of the cell. A cell/carrier (e.g., CC) is commonly called a cell.

When the base station and the UE transmit and receive signals on carrier-aggregated LCC and UCC as shown in FIG. 8, the LCC and the UCC may be configured as a primary CC (PCC) and a secondary CC (SCC), respectively. The base station and the UE may transmit and receive signals on one UCC or on a plurality of carrier-aggregated UCCs as shown in FIG. 9. In other words, the base station and the UE may transmit and receive signals only on UCC(s) without using any LCC. For a standalone operation, PRACH transmission, PUCCH transmission, PUSCH transmission, SRS transmission, etc. may be supported on a UCell.

In the embodiment of FIG. 8 and FIG. 9, the base station may be replaced with the UE. In this case, for example, PSCCH transmission, PSSCH transmission, PSFCH transmission, S-SSB transmission, etc. may be supported on a UCell.

Unless otherwise noted, the definitions below are applicable to the following terminologies used in the present disclosure.

Channel: a carrier or a part of a carrier composed of a contiguous set of RBs in which a channel access procedure is performed in a shared spectrum.

Channel access procedure (CAP): a procedure of assessing channel availability based on sensing before signal transmission in order to determine whether other communication node(s) are using a channel. A basic sensing unit is a sensing slot with a duration of Tsl=9 us. The base station or the UE senses a channel during a sensing slot duration. If power detected for at least 4 us within the sensing slot duration is less than an energy detection threshold Xthresh, the sensing slot duration Tsl is considered to be idle. Otherwise, the sensing slot duration Tsl=9 us is considered to be busy. CAP may also be referred to as listen before talk (LBT).

Channel occupancy: transmission(s) on channel(s) by the base station/UE after a channel access procedure.

Channel occupancy time (COT): a total time during which the base station/UE and any base station/UE(s) sharing channel occupancy can perform transmission(s) on a channel after the base station/UE perform a channel access procedure. In the case of determining COT, if a transmission gap is less than or equal to 25 us, the gap duration may be counted in the COT. The COT may be shared for transmission between the base station and corresponding UE(s).

DL transmission burst: a set of transmissions without any gap greater than 16 us from the base station. Transmissions from the base station, which are separated by a gap exceeding 16 us are considered as separate DL transmission bursts. The base station may perform transmission(s) after a gap without sensing channel availability within a DL transmission burst.

UL or SL transmission burst: a set of transmissions without any gap greater than 16 us from the UE. Transmissions from the UE, which are separated by a gap exceeding 16 us are considered as separate UL or SL transmission bursts. The UE may perform transmission(s) after a gap without sensing channel availability within a UL or SL transmission burst.

Discovery burst: a DL transmission burst including a set of signal(s) and/or channel(s) confined within a window and associated with a duty cycle. In the LTE-based system, the discovery burst may be transmission(s) initiated by the base station, which includes PSS, an SSS, and cell-specific RS (CRS) and further includes non-zero power CSI-RS. In the NR-based system, the discover burst may be transmission(s) initiated by the base station, which includes at least an SS/PBCH block and further includes CORESET for a PDCCH scheduling a PDSCH carrying SIB1, the PDSCH carrying SIB1, and/or non-zero power CSI-RS.

Figure 10:
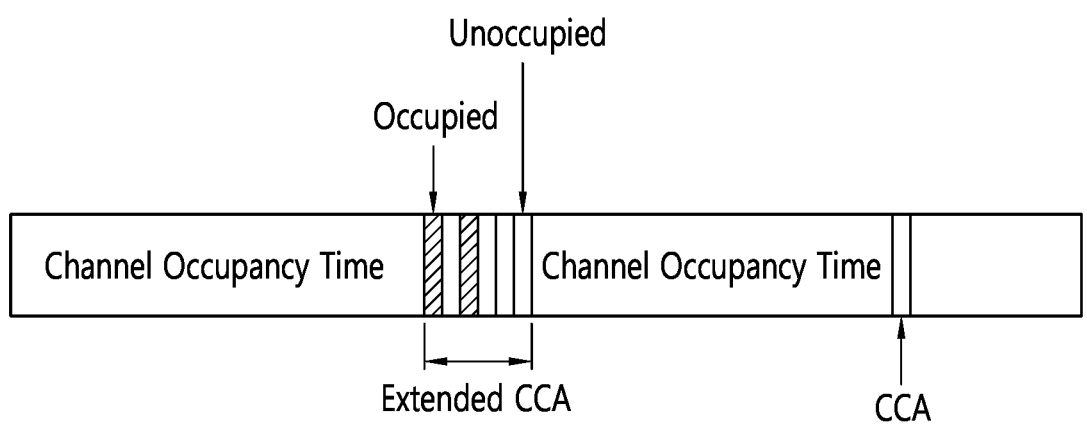
FIG. 10 shows a method of occupying resources in an unlicensed band, based on an embodiment of the present disclosure.

FIG. 10 shows a method of occupying resources in an unlicensed band, based on an embodiment of the present disclosure. The embodiment of FIG. 10 may be combined with various embodiments of the present disclosure.

Referring to FIG. 10, a communication node (e.g., base station, UE) within an unlicensed band should determine whether other communication node(s) is using a channel before signal transmission. To this end, the communication node within the unlicensed band may perform a channel access procedure (CAP) to access channel(s) on which transmission(s) is performed. The channel access procedure may be performed based on sensing. For example, the communication node may perform carrier sensing (CS) before transmitting signals so as to check whether other communication node(s) perform signal transmission. When the other communication node(s) perform no signal transmission, it is said that clear channel assessment (CCA) is confirmed. If a CCA threshold (e.g., XThresh) is predefined or configured by a higher layer (e.g., RRC), the communication node may determine that the channel is busy if the detected channel energy is higher than the CCA threshold. Otherwise, the communication node may determine that the channel is idle. If it is determined that the channel is idle, the communication node may start the signal transmission in the unlicensed band. The CAP may be replaced with the LBT.

Table 8 shows an example of the channel access procedure (CAP) supported in NR-U.

TABLE 8

| | Type | Explanation |
|---|---|---|
| DL | Type 1 CAP | CAP with random back-off time duration spanned by the sensing slots that are sensed to be idle before a downlink transmission(s) is random |
| | Type 2 CAP | CAP without random back-off |
| | Type 2A, 2B, 2C | time duration spanned by sensing slots that are sensed to be idle before a downlink transmission(s) is deterministic |
| UL or SL | Type 1 CAP | CAP with random back-off time duration spanned by the sensing slots that are sensed to be idle before an uplink or sidelink transmission(s) is random |
| | Type 2 CAP | CAP without random back-off |
| | Type 2A, 2B, 2C | time duration spanned by sensing slots that are sensed to be idle before an uplink or sidelink transmission(s) is deterministic |

Referring to Table 8, the LBT type or CAP for DL/UL/SL transmission may be defined. However, Table 8 is only an example, and a new type or CAP may be defined in a similar manner. For example, the type 1 (also referred to as Cat-4 LBT) may be a random back-off based channel access procedure. For example, in the case of Cat-4, the contention window may change. For example, the type 2 can be performed in case of COT sharing within COT obtained by the base station (gNB) or the UE.

Hereinafter, LBT-SubBand (SB) (or RB set) will be described.

In a wireless communication system supporting an unlicensed band, one cell (or carrier (e.g., CC)) or BWP configured for the UE may have a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information.

Figure 11:
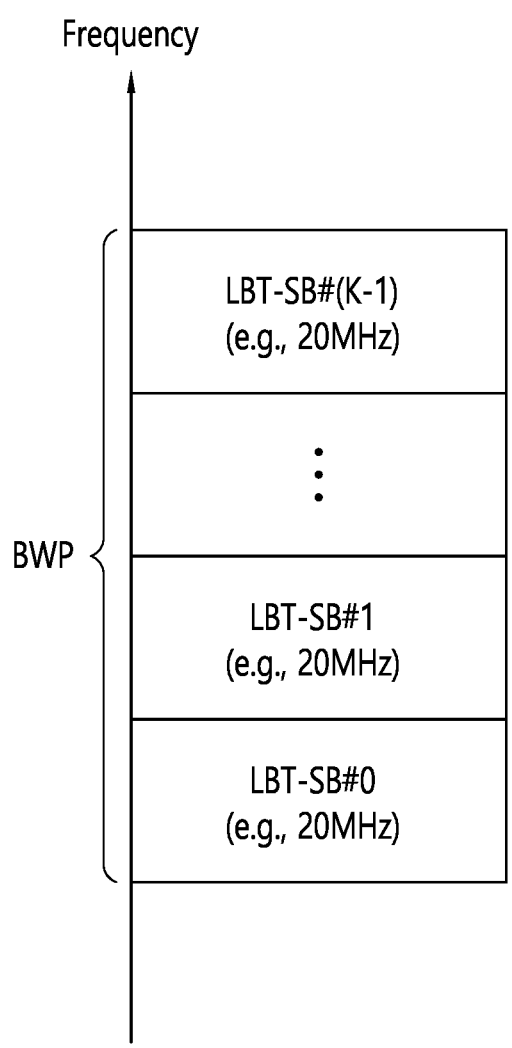
FIG. 11 shows a case in which a plurality of LBT-SBs are included in an unlicensed band, based on an embodiment of the present disclosure.

FIG. 11 shows a case in which a plurality of LBT-SBs are included in an unlicensed band, based on an embodiment of the present disclosure. The embodiment of FIG. 11 may be combined with various embodiments of the present disclosure.

Referring to FIG. 11, a plurality of LBT-SBs may be included in the BWP of a cell (or carrier). An LBT-SB may have, for example, a 20-MHz band. The LBT-SB may include a plurality of contiguous (P) RBs in the frequency domain, and thus may be referred to as a (P) RB set. While not shown, a guard band (GB) may be interposed between LBT-SBs. Accordingly, the BWP may be configured in the form of {LBT-SB #0 (RB set #0)+GB #0+LBT-SB #1 (RB set #1+GB #1)+ . . . +LBT-SB #(K−1) (RB set (#K−1))}. For convenience, LBT-SB/RB indexes may be configured/defined in an increasing order from the lowest frequency to the highest frequency.

Hereinafter, a channel access priority class (CAPC) will be described.

The CAPCs of MAC CEs and radio bearers may be fixed or configured to operate in FR1:
  Fixed to lowest priority for padding buffer status report (BSR) and recommended bit rate MAC CE;
  Fixed to highest priority for SRB0, SRB1, SRB3 and other MAC CEs;
  Configured by the base station for SRB2 and DRB.

When selecting a CAPC of a DRB, the base station considers fairness between other traffic types and transmissions while considering 5QI of all QoS flows multiplexed to the corresponding DRB. Table 9 shows which CAPC should be used for standardized 5QI, that is, a CAPC to be used for a given QoS flow. For standardized 5QI, CAPCs are defined as shown in the table below, and for non-standardized 5QI, the CAPC with the best QoS characteristics should be used.

TABLE 9

| CAPC | 5QI |
|---|---|
| 1 | 1, 3, 5, 65, 66, 67, 69, 70, 79, 80, 82, 83, 84, 85 |
| 2 | 2, 7, 71 |
| 3 | 4, 6, 8, 9, 72, 73, 74, 76 |
| 4 | — |

NOTE:
A lower CAPC value indicates a higher priority.

Hereinafter, a method of transmitting a downlink signal through an unlicensed band will be described. For example, a method of transmitting a downlink signal through an unlicensed band may be applied to a method of transmitting a sidelink signal through an unlicensed band.

The base station may perform one of the following channel access procedures (e.g., CAP) for downlink signal transmission in an unlicensed band.

(1) Type 1 downlink (DL) CAP Method

In the type 1 DL CAP, the length of a time duration spanned by sensing slots sensed to be idle before transmission(s) may be random. The type 1 DL CAP may be applied to the following transmissions:
  Transmission(s) initiated by the base station including (i) a unicast PDSCH with user plane data or (ii) the unicast PDSCH with user plane data and a unicast PDCCH scheduling user plane data, or
  Transmission(s) initiated by the base station including (i) a discovery burst only or (ii) a discovery burst multiplexed with non-unicast information.

Figure 12:
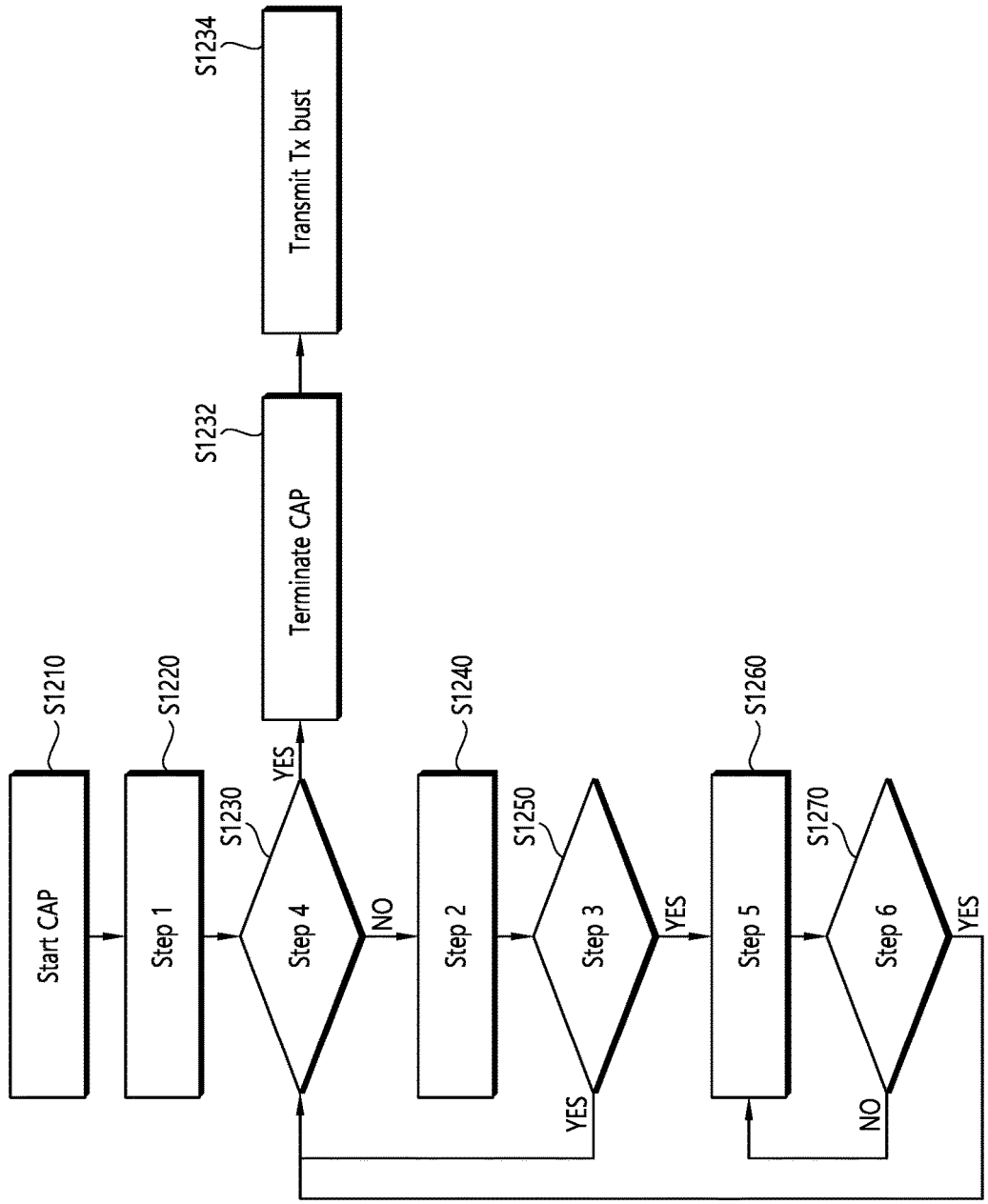
FIG. 12 shows CAP operations performed by a base station to transmit a downlink signal through an unlicensed band, based on an embodiment of the present disclosure.

FIG. 12 shows CAP operations performed by a base station to transmit a downlink signal through an unlicensed band, based on an embodiment of the present disclosure. The embodiment of FIG. 12 may be combined with various embodiments of the present disclosure.

Referring to FIG. 12, the base station may sense whether a channel is idle for sensing slot durations of a defer duration Td. Then, if a counter N is zero, the base station may perform transmission (S134). In this case, the base station may adjust the counter N by sensing the channel for additional sensing slot duration(s) according to the following steps:

Step 1) (S120) The base station sets N to Ninit (N=Ninit), where Ninit is a random number uniformly distributed between 0 and CWp. Then, step 4 proceeds.

Step 2) (S140) If N>0 and the base station determines to decrease the counter, the base station sets N to N−1 (N=N−1).

Step 3) (S150) The base station senses the channel for the additional sensing slot duration. If the additional sensing slot duration is idle (Y), step 4 proceeds. Otherwise (N), step 5 proceeds.

Step 4) (S130) If N=0 (Y), the base station terminates the CAP (S132). Otherwise (N), step 2 proceeds.

Step 5) (S160) The base station senses the channel until either a busy sensing slot is detected within an additional defer duration Td or all the slots of the additional defer duration Td are detected to be idle.

Step 6) (S170) If the channel is sensed to be idle for all the slot durations of the additional defer duration Td (Y), step 4 proceeds. Otherwise (N), step 5 proceeds.

Table 10 shows that mp, a minimum contention window (CW), a maximum CW, a maximum channel occupancy time (MCOT), and an allowed CW size, which are applied to the CAP, vary depending on channel access priority classes.

TABLE 10

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Referring to Table 10, a contention window size (CWS), a maximum COT value, etc. for each CAPC may be defined. For example, $T_d$ may be equal to $T_f+m_p*T_{sl}$ ($T_d=T_f+m_p*T_{sl}$).

The defer duration $T_d$ is configured in the following order: duration $T_f$(16 us)+$m_p$ consecutive sensing slot durations $T_{sl}$ (9 us). $T_f$ includes the sensing slot duration $T_{sl}$ at the beginning of the 16 us duration.

The following relationship is satisfied: $CW_{min,p}<=CW_p<=CW_{max,p}$. $CW_p$ may be configured by $CW_p=CW_{min,p}$ and updated before step 1 based on HARQ-ACK feedback (e.g., the ratio of ACK or NACK) for a previous DL burst (e.g., PDSCH) (CW size update). For example, $CW_p$ may be initialized to $CW_{min,p}$ based on the HARQ-ACK feedback for the previous DL burst. Alternatively, $CW_p$ may be increased to the next higher allowed value or maintained as it is.

(2) Type 2 Downlink (DL) CAP Method

In the type 2 DL CAP, the length of a time duration spanned by sensing slots sensed to be idle before transmission(s) may be determined. The type 2 DL CAP is classified into type 2A/2B/2C DL CAPs.

The type 2A DL CAP may be applied to the following transmissions. In the type 2A DL CAP, the base station may perform transmission immediately after the channel is sensed to be idle at least for a sensing duration $T_{short\_dl}=25$ us. Herein, $T_{short\_dl}$ includes the duration $T_f$(=16 us) and one sensing slot duration immediately after the duration $T_f$, where the duration $T_f$ includes a sensing slot at the beginning thereof.

Transmission(s) initiated by the base station including (i) a discovery burst only or (ii) a discovery burst multiplexed with non-unicast information, or Transmission(s) by the base station after a gap of 25 us from transmission(s) by the UE within a shared channel occupancy.

The type 2B DL CAP is applicable to transmission(s) performed by the base station after a gap of 16 us from transmission(s) by the UE within a shared channel occupancy time. In the type 2B DL CAP, the base station may perform transmission immediately after the channel is sensed to be idle for $T_f$=16 us. $T_f$ includes a sensing slot within 9 us from the end of the duration. The type 2C DL CAP is applicable to transmission(s) performed by the base station after a maximum of 16 us from transmission(s) by the UE within the shared channel occupancy time. In the type 2C DL CAP, the base station does not perform channel sensing before performing transmission.

Hereinafter, a method of transmitting an uplink signal through an unlicensed band will be described. For example, a method of transmitting an uplink signal through an unlicensed band may be applied to a method of transmitting a sidelink signal through an unlicensed band.

The UE may perform type 1 or type 2 CAP for UL signal transmission in an unlicensed band. In general, the UE may perform the CAP (e.g., type 1 or type 2) configured by the base station for UL signal transmission. For example, a UL grant scheduling PUSCH transmission (e.g., DCI formats 0_0 and 0_1) may include CAP type indication information for the UE.

(1) Type 1 Uplink (UL) CAP Method

In the type 1 UL CAP, the length of a time duration spanned by sensing slots sensed to be idle before transmission(s) is random. The type 1 UL CAP may be applied to the following transmissions.

PUSCH/SRS transmission(s) scheduled and/or configured by the base station

PUCCH transmission(s) scheduled and/or configured by the base station

Transmission(s) related to a random access procedure (RAP)

Figure 13:
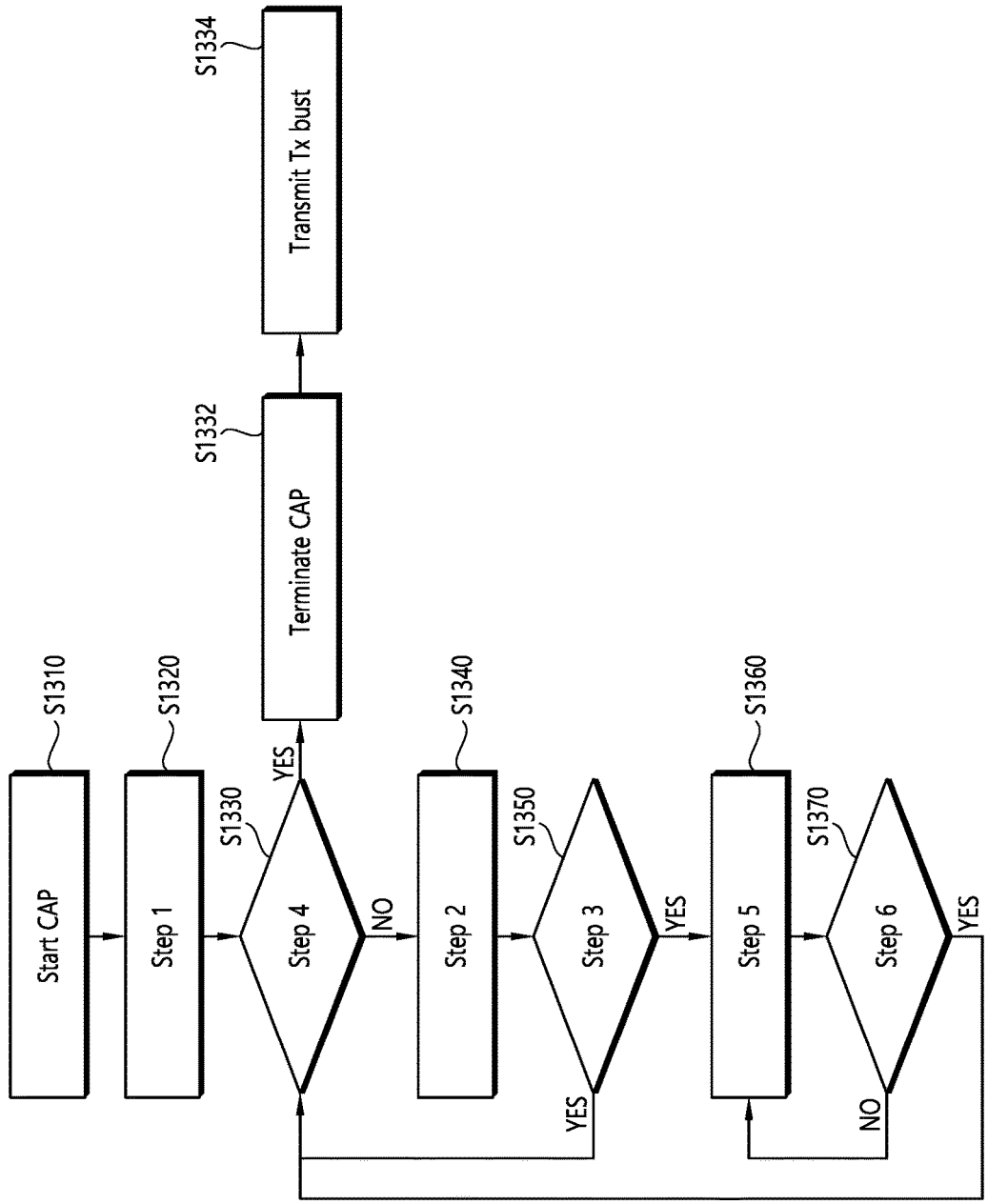
FIG. 13 shows type 1 CAP operations performed by a UE to transmit an uplink signal, based on an embodiment of the present disclosure.

FIG. 13 shows type 1 CAP operations performed by a UE to transmit an uplink signal, based on an embodiment of the present disclosure. The embodiment of FIG. 13 may be combined with various embodiments of the present disclosure.

Referring to FIG. 13, the UE may sense whether a channel is idle for sensing slot durations of a defer duration Ta. Then, if a counter N is zero, the UE may perform transmission (S234). In this case, the UE may adjust the counter N by sensing the channel for additional sensing slot duration(s) according to the following steps:

Step 1) (S220) The UE sets N to $N_{init}$ (N=$N_{init}$), where $N_{init}$ is a random number uniformly distributed between 0 and $CW_p$. Then, step 4 proceeds.

Step 2) (S240) If N>0 and the UE determines to decrease the counter, the UE sets N to N−1 (N=N−1).

Step 3) (S250) The UE senses the channel for the additional sensing slot duration. If the additional sensing slot duration is idle (Y), step 4 proceeds. Otherwise (N), step 5 proceeds.

Step 4) (S230) If N=0 (Y), the UE terminates the CAP (S232). Otherwise (N), step 2 proceeds.

Step 5) (S260) The UE senses the channel until either a busy sensing slot is detected within an additional defer duration $T_d$ or all the slots of the additional defer duration $T_d$ are detected to be idle.

Step 6) (S270) If the channel is sensed to be idle for all the slot durations of the additional defer duration $T_d$ (Y), step 4 proceeds. Otherwise (N), step 5 proceeds.

Table 11 shows that $m_p$, a minimum CW, a maximum CW, a maximum channel occupancy time (MCOT), and an allowed CW size, which are applied to the CAP, vary depending on channel access priority classes.

TABLE 11

| Channel Access Priority Class (p) | $m_p$ | $CW_{min, p}$ | $CW_{max, p}$ | $T_{ulmcot, p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

Referring to Table 11, a contention window size (CWS), a maximum COT value, etc. for each CAPC may be defined. For example, $T_d$ may be equal to $T_f+m_p*T_{sl}$ ($T_d=T_f+m_p*T_{sl}$).

The defer duration $T_d$ is configured in the following order: duration $T_f$ (16 us)+$m_p$ consecutive sensing slot durations $T_{sl}$ (9 us). $T_f$ includes the sensing slot duration $T_{sl}$ at the beginning of the 16 us duration.

The following relationship is satisfied: $CW_{min,p}<=CW_p<=CW_{max,p}$. $CW_p$ may be configured by $CW_p=CW_{min,p}$ and updated before step 1 based on an explicit/implicit reception response for a previous UL burst (e.g., PUSCH) (CW size update). For example, $CW_p$ may be initialized to $CW_{min,p}$ based on the explicit/implicit reception response for the previous UL burst. Alternatively, $CW_p$ may be increased to the next higher allowed value or maintained as it is.

(2) Type 2 uplink (UL) CAP Method

In the type 2 UL CAP, the length of a time duration spanned by sensing slots sensed to be idle before transmission(s) may be determined. The type 2 UL CAP is classified into type 2A/2B/2C UL CAPs. In the type 2A UL CAP, the UE may perform transmission immediately after the channel is sensed to be idle at least for a sensing duration $T_{short\_dl}$=25 us. Herein, $T_{short\_dl}$ includes the duration $T_f$(=16 us) and one sensing slot duration immediately after the duration $T_f$. In the type 2A UL CAP, $T_f$ includes a sensing slot at the beginning thereof. In the type 2B UL CAP, the UE may perform transmission immediately after the channel is sensed to be idle for the sensing duration $T_f$=16 us. In the type 2B UL CAP, $T_f$ includes a sensing slot within 9 us from the end of the duration. In the type 2C UL CAP, the UE does not perform channel sensing before performing transmission.

For example, according to the type 1 LBT-based NR-U operation, the UE having uplink data to be transmitted may select a CAPC mapped to 5QI of data, and the UE may perform the NR-U operation by applying parameters of the corresponding CACP (e.g., minimum contention window size, maximum contention window size, $m_p$, etc.). For example, the UE may select a backoff counter (BC) after selecting a random value between the minimum CW and the maximum CW mapped to the CAPC. In this case, for example, the BC may be a positive integer less than or equal to the random value. The UE sensing a channel decreases the BC by 1 if the channel is idle. If the BC becomes zero and the UE detects that the channel is idle for the time $T_d$ ($T_d=T_f+m_p*T_{sl}$), the UE may attempt to transmit data by occupying the channel. For example, $T_{sl}$ (=9 usec) is a basic sensing unit or sensing slots, and may include a measurement duration for at least 4 usec. For example, the front 9 usec of $T_f$ (=16 usec) may be configured to be $T_{sl}$.

For example, according to the type 2 LBT-based NR-U operation, the UE may transmit data by performing the type 2 LBT (e.g., type 2A LBT, type 2B LBT, or type 2C LBT) within COT.

For example, the type 2A (also referred to as Cat-2 LBT (one shot LBT) or one-shot LBT) may be 25 usec one-shot LBT. In this case, transmission may start immediately after idle sensing for at least a 25 usec gap. The type 2A may be used to initiate transmission of SSB and non-unicast DL information. That is, the UE may sense a channel for 25 usec within COT, and if the channel is idle, the UE may attempt to transmit data by occupying the channel.

For example, the type 2B may be 16 usec one-shot LBT. In this case, transmission may start immediately after idle sensing for a 16 usec gap. That is, the UE may sense a channel for 16 usec within COT, and if the channel is idle, the UE may attempt to transmit data by occupying the channel.

For example, in the case of the type 2C (also referred to as Cat-1 LBT or No LBT), LBT may not be performed. In this case, transmission may start immediately after a gap of up to 16 usec and a channel may not be sensed before the transmission. The duration of the transmission may be up to 584 usec. The UE may attempt transmission after 16 usec without sensing, and the UE may perform transmission for up to 584 usec.

In a sidelink unlicensed band, the UE may perform a channel access operation based on Listen Before Talk (LBT). Before the UE accesses a channel in an unlicensed band, the UE should check whether the channel to be accessed is idle (e.g., a state in which UEs do not occupy the channel, a state in which UEs can access the corresponding channel and transmit data) or busy (e.g., a state in which the channel is occupied and data transmission/reception is performed on the corresponding channel, and the UE attempting to access the channel cannot transmit data while the channel is busy). That is, the operation in which the UE checks whether the channel is idle or busy may be referred to as Clear Channel Assessment (CCA), and the UE may check whether the channel is idle or busy for the CCA duration.

Figure 14:
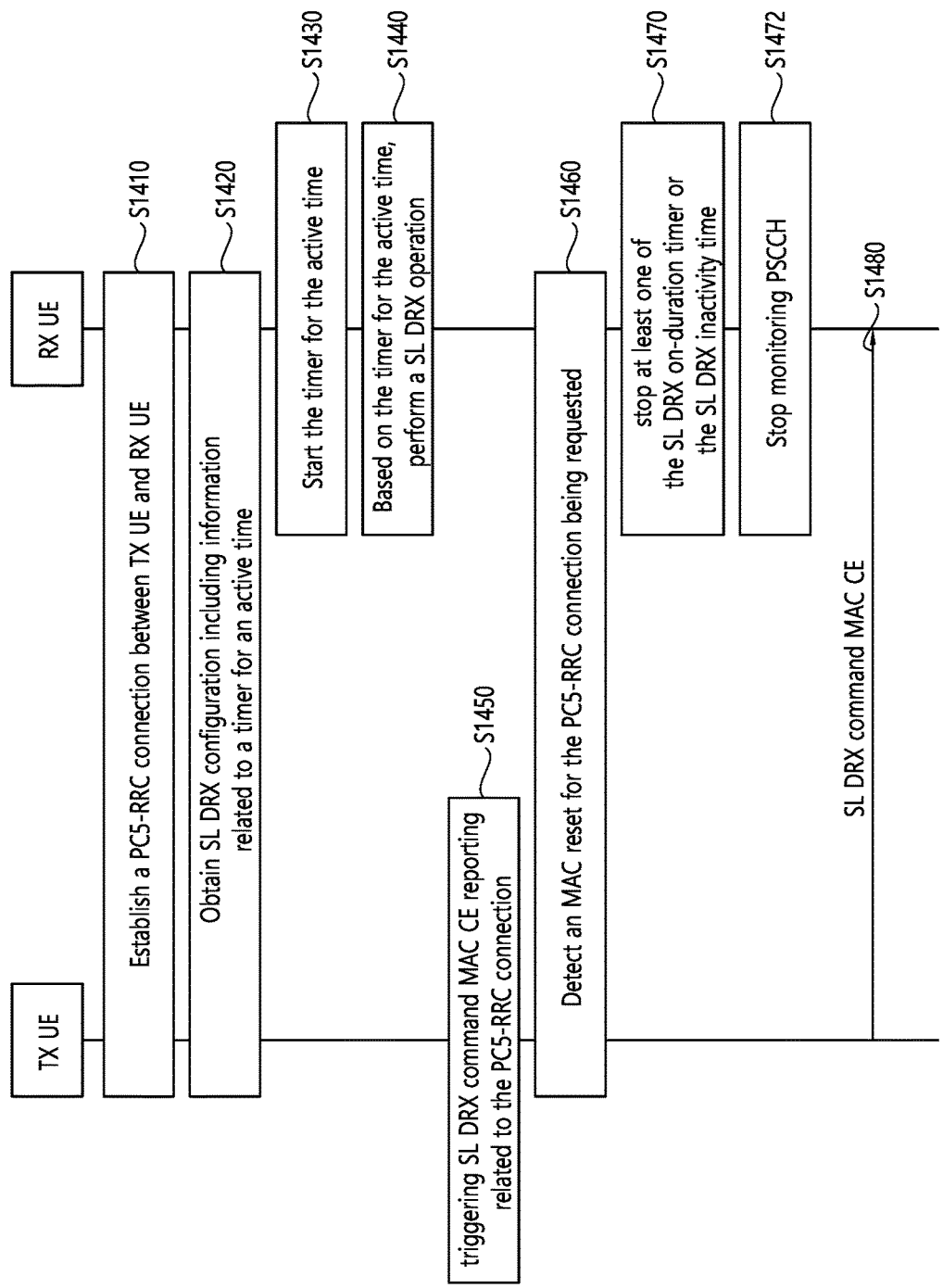
FIG. 14 is a view for explaining problems with a method for performing wireless communication related to a MAC reset according to an embodiment of the present disclosure.

FIG. 14 is a view for explaining problems with a method for performing wireless communication related to a MAC reset according to an embodiment of the present disclosure. The embodiment of FIG. 14 may be combined with various embodiments of the present disclosure.

Referring to FIG. 14, in an embodiment of the present disclosure, for example, a PC5-RRC connection may be established between a TX UE and an RX UE in step S1410. The PC5-RRC connection may include at least one PC5-unicast connection. In step S1420, for example, the TX UE and/or the RX UE may obtain an SL DRX configuration including information related to an SL DRX cycle and information related to a timer for active time. For example, the timer for active time may include at least one of an SL DRX on-duration timer or an SL DRX inactivity timer. For example, a time during which the SL DRX on-duration timer is running or a time during which the SL DRX inactivity timer is running may be a time included in an active time of the RX UE. In step S1430, for example, the RX UE may start the timer for active time. In step S1440, for example, the RX UE may perform an SL DRX operation based on the timer for active time. For example, the RX UE may receive/monitor a transport block (TB) (e.g., or a MAC PDU) (e.g., reception/monitoring of PSCCH/PSSCH) within the active time. For example, the RX UE may not receive/monitor a TB (e.g., or a MAC PDU) during a time other than the active time (e.g., reception/monitoring of PSCCH/PSSCH).

In step S1450, for example, the TX UIE may start/trigger SL DRX command MAC CE reporting related to the PC5-RRC connection. In step S1460, for example, the TX UE and/or the RX UE may detect a request for an MAC reset related to the PC5-RRC connection. In step S1470, for example, if the timer for active time is running, and upon receiving an MAC reset related to the PC5-RRC connection, the RX UE may stop the timer for active time (e.g., a timer related to the PC5-RRC connection (e.g., DRX on-duration timer, a DRX inactivity timer)). In step S1472, for example, upon receiving a request for an MAC reset related to the PC5-RRC connection, the RX UE may stop receiving/monitoring a TB (e.g., or a MAC PDU) (e.g., reception/monitoring of PSCCH/PSSCH).

By the way, for example, a MAC CE reporting procedure for the TX UE may be carried out regardless of the request for a MAC reset. Accordingly, for example, as in step S1480, if the TX UE transmits an SL DRX command MAC CE related to a specific PC5-RRC connection to the RX UE, the timer for active time of the RX UE may be unnecessarily additionally stopped. Moreover, for example, if the TX UE transmits an SL DRX command MAC CE not related to a specific PC5-RRC connection to the RX UE, and the timer for active time for the RX UE is running, the timer for active time for the RX UE may be unintentionally stopped. Furthermore, for example, a DRX command MAC CE (e.g., a long DRX command MAC CE) may be unnecessarily generated and/or signaled even if the UE receives a request for a sidelink interface MAC reset. For example, if a DRX command MAC CE (e.g., a long DRX command MAC CE) is included in a MAC PDU, a MAC PDU containing a DRX command MAC CE may be unnecessarily generated and/or signaled even if the UE receives a request for a sidelink interface MAC reset.

According to an embodiment of the present disclosure, in the event of an SL MAC Reset at NR-V2X, a UE may perform an operation related to an MAC reset.

According to an embodiment of the present disclosure, for example, if a UE receives an SL RLF (radio link failure) declaration or an SL LBT (listen before talk) failure declaration or receives an indication of release of a PC5 RRC Connection from a higher layer (e.g., V2X Layer), the UE may perform an SL MAC reset procedure.

For example, if a UE receives an SL RLF (radio link failure) declaration or an SL LBT (listen before talk) failure declaration or receives an indication of release of a PC5 RRC Connection from a higher layer (e.g., V2X Layer), the UE may perform an SL specific MAC reset for a specific unicast link (e.g., a pair of Source Layer-2 ID and Destination Layer-2 ID or PC5 Link Identifier) where an SL LBT failure or an SL RLF has occurred or an indication of release of a specific PC5 RRC Connection (e.g., a PC5 RRC Connection associated with a specific PC5 unicast link) is received from a higher layer. For example, if a transmitting UE has multiple unicast links with a destination UE with which a unicast link is established, the transmitting UE may release all MAC/RRC-related timers operating for a specific unicast link where an SL LBT failure/SL RLF is declared or an indication of release of a PC5 RRC connection is received from a higher layer, and/or the transmitting UE may reset or initialize MAC-related parameters. For example, in the event of an SL specific MAC reset, the UE may release or cancel or stop or reset or initialize timers or parameters as in the following Table 12.

TABLE 12

If a Sidelink specific reset of the MAC entity is requested for a PC5-RRC connection by upper layers, the MAC entity shall:
1>    flush the soft buffers for all Sidelink processes for all TB(s) associated to the PC5-RRC connection;
1>    consider all Sidelink processes for all TB(s) associated to the PC5-RRC connection as unoccupied;
1>    cancel, if any, triggered Scheduling Request procedure only associated to the PC5-RRC connection;
1>    cancel, if any, triggered Sidelink Buffer Status Reporting procedure only associated to the PC5-RRC connection;
1> cancel, if any, triggered Sidelink CSI Reporting procedure associated to the PC5-RRC connection;
1> cancel, if any, triggered Sidelink IUC Information Reporting procedure associated to the PC5-RRC connection;
1> cancel, if any, triggered Sidelink DRX Command MAC CE reporting procedure only to associated to the PC5-RRC connection;
Transmitting UE operation: In the event of an SL MAC Reset, the transmitting UE may stop the SL DRX onduration timer and the SL DRX inactivity timer which are operating in a specific unicast link (per direction per a pair of Source Layer-2 ID and Destination Layer-2 ID or PC5 Link Identifier) where the SL MAC Reset has occurred.
Receiving UE operation: In the event of an SL MAC Reset, the receiving UE may stop the SL DRX onduration timer and the SL DRX inactivity timer which are operating in a specific unicast link (per direction per a pair of Source Layer-2 ID and Destination Layer-2 ID or PC5 Link Identifier) where the SL MAC reset has occurred, and may not perform a PSCCH/PSSCH monitoring operation for receiving data transmitted by the TX UE until the beginning of the next SL DRX cycle.
1>    stop (if running) all timers associated to the PC5-RRC connection;
1>    reset the numConsecutiveDTX associated to the PC5-RRC connection;
1> reset the SL_LBT_COUNTER associated to the PC5-RRC connection;
1> initialize SBj for each logical channel associated to the PC5-RRC connection to zero.

According to an embodiment of the present disclosure, for example, even if an indication of release of an SL LBT failure/SL RLF/PC5 RRC connection has occurred in a specific unicast link (e.g., a pair of Source Layer-2 ID and Destination Layer-2 ID or PC5 Link Identifier), an SL specific MAC reset may be performed for all unicast links (if multiple unicast links are configured) of the destination UE (Destination Layer-2 ID). For example, if the transmitting UE has multiple unicast links with the destination UE with which a unicast link is established, when the transmitting UE declares an SL LBT failure/SL RLF or the transmitting UE receives an indication of release of a PC5 RRC connection from a V2X layer, the transmitting UE may release all MAC/RRC-related timers operating for all unicast links and/or reset or initialize MAC-related parameters. For example, in the event of an SL specific MAC reset, the UE may release or cancel or stop or reset or initialize timers or parameters as in Table 13.

TABLE 13

If a Sidelink specific reset of the MAC entity is requested for a PC5-RRC connection by upper layers, the MAC entity shall:
1>     flush the soft buffers for all Sidelink processes for all TB(s) associated to the PC5-RRC connection;
1>     consider all Sidelink processes for all TB(s) associated to the PC5-RRC connection as unoccupied;
1>     cancel, if any, triggered Scheduling Request procedure only associated to the PC5-RRC connection;
1>     cancel, if any, triggered Sidelink Buffer Status Reporting procedure only associated to the PC5-RRC connection;
1>     cancel, if any, triggered Sidelink CSI Reporting procedure associated to the PC5-RRC connection;
1> cancel, if any, triggered Sidelink IUC Information Reporting procedure associated to the PC5-RRC connection;
1> cancel, if any, triggered Sidelink DRX Command MAC CE reporting procedure only to associated to the PC5-RRC connection;
Transmitting UE operation: In the event of an SL MAC Reset, the transmitting UE may stop the SL DRX onduration timer and the SL DRX inactivity timer which are operating in all unicast links (per direction per a pair of Source Layer-2 ID and Destination Layer-2 ID or PC5 Link Identifier) associated with the Destination Layer-2 ID where the SL MAC Reset has occurred.
Receiving UE operation: In the event of an SL MAC Reset, the receiving UE may stop the SL DRX onduration timer and the SL DRX inactivity timer which are operating in all unicast links (per direction per a pair of Source Layer-2 ID and Destination Layer-2 ID or PC5 Link Identifier) associated with the Destination Layer-2 ID where the SL MAC reset has occurred, and may not perform a PSCCH/PSSCH monitoring operation for receiving data transmitted by the TX UE until the beginning of the next SL DRX cycle.
1>     stop (if running) all timers associated to the PC5-RRC connection;
1>     reset the numConsecutiveDTX associated to the PC5-RRC connection;
1> reset the SL_LBT_COUNTER associated to the PC5-RRC connection;
1> initialize SBj for each logical channel associated to the PC5-RRC connection to zero.

According to an embodiment of the present disclosure, an SL DRX Command MAC CE operation may be performed. For example, a TX UE may transmit an SL DRX Command MAC CE to an RX UE with which a unicast connection is set up, and the TX UE may stop the SL DRX Onduration timer and the SL DRX Inactivity timer which are being operated by the RX UE, and the TX UE may cause the RX UE not to perform a PSCCH/PSSCH monitoring operation for receiving data (e.g., data transmitted by the TX UE) until the beginning of the next SL DRX cycle. For example, the TX UE may transmit an SL DRX Command MAC CE to the RX UE for each specific SL Unicast link (e.g., (e.g., per direction) per a pair of Source Layer-2 ID and Destination Layer-2 ID or PC5 Link Identifier). For example, upon receiving an SL DRX Command MAC CE from the TX UE, the RX UE may stop the SL DRX Onduration timer and the SL DRX Inactivity timer which are operating in a specific SL unicast link (e.g., (e.g., per direction) per a pair of Source Layer-2 ID and Destination Layer-2 ID or a PC5 Link Identifier), and may not perform a PSCCH/PSSCH monitoring operation for receiving data transmitted by the TX UE until the beginning of the next SL DRX cycle.

Figure 15:
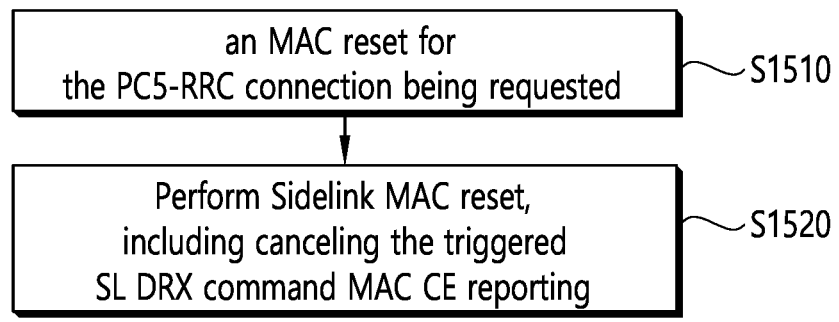
FIG. 15 is a view for explaining a method for performing wireless communication related to a MAC reset according to an embodiment of the present disclosure.

FIG. 15 is a view for explaining a method for performing wireless communication related to a MAC reset according to an embodiment of the present disclosure. The embodiment of FIG. 15 may be combined with various embodiments of the present disclosure.

Referring to FIG. 15, according to an embodiment of the present disclosure, for example, a UE may receive a request for a sidelink MAC reset in step S1510. For example, the MAC entity of the UE may receive a sidelink-specific MAC reset for a PC5-RRC connection from an upper layer. For example, in step S1520, if an SL DRX command MAC CE reporting procedure of the UE is triggered, the UE may perform a sidelink MAC reset including an operation of canceling the triggered SL DRX MAC CE reporting. For example, if an SL DRX command MAC CE reporting procedure of the UE is triggered, the UE may perform a sidelink MAC reset including an operation of canceling SL DRX MAC CE reporting related to the PC5-RRC connection.

Therefore, according to an embodiment of the present disclosure, for example, the DRX command MAC CE reporting procedure of the UE may be canceled based on the sidelink MAC reset. For example, it is possible to solve the problem of unnecessarily generating and/or signaling a DRX command MAC CE even if the UE receives a request for a sidelink interface MAC reset. For example, after a sidelink interface MAC reset related to a specific PC5-RRC connection has occurred, a DRX timer not related to the specific PC5-RRC connection may be kept from stopping due to an unnecessary DRX command MAC CE. For example, after a sidelink interface MAC reset related to a specific PC5-RRC connection has occurred, a DRX timer related to the specific PC5-RRC connection may be kept from stopping additionally due to an unnecessary DRX command MAC CE.

Figure 16:
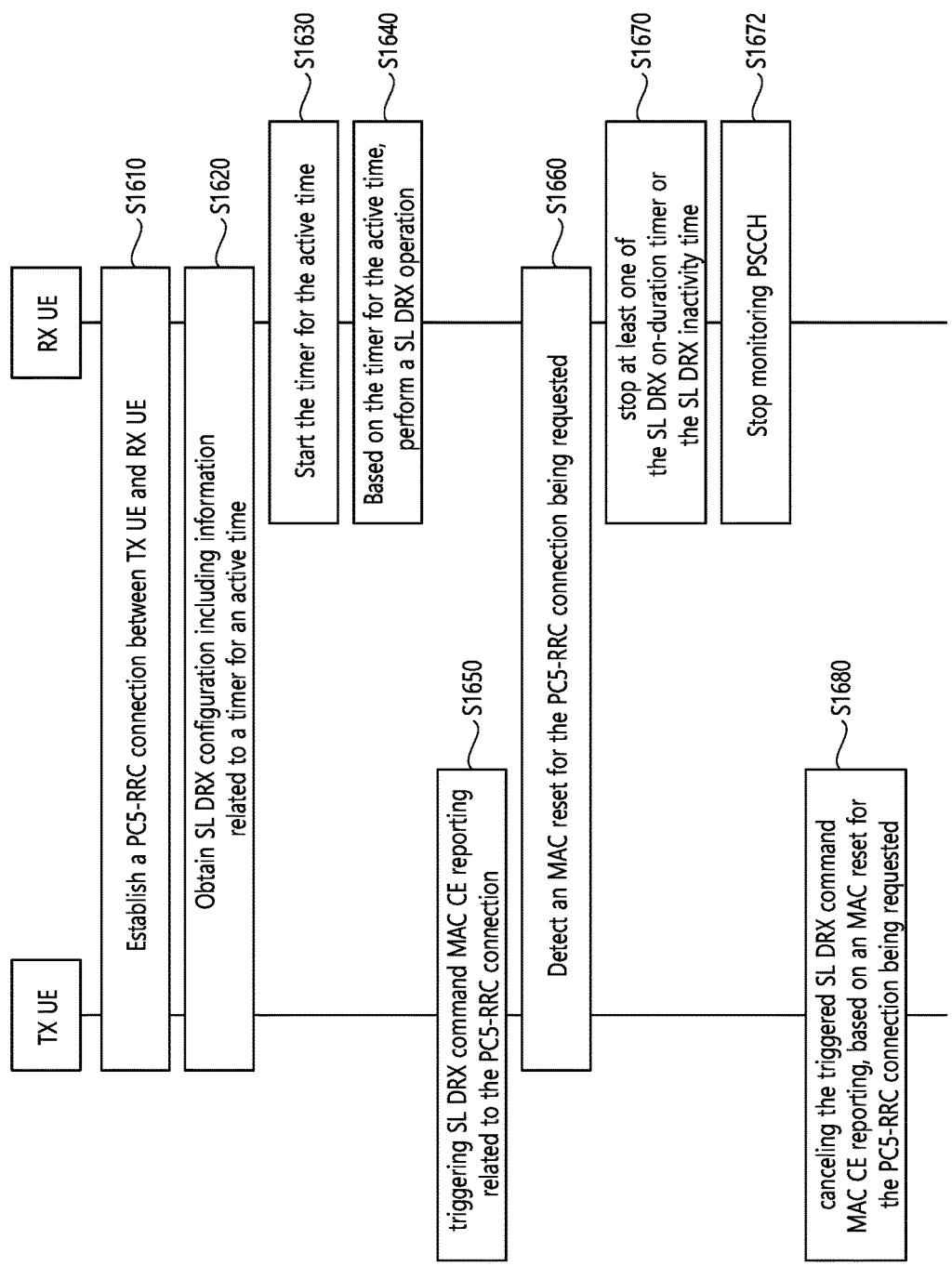
FIG. 16 is a view for explaining a procedure for performing wireless communication related to a MAC reset according to an embodiment of the present disclosure.

FIG. 16 is a view for explaining a procedure for performing wireless communication related to a MAC reset according to an embodiment of the present disclosure. The embodiment of FIG. 16 may be combined with various embodiments of the present disclosure.

Referring to FIG. 16, in step S1610, a PC5-RRC connection may be established between a TX UE and an RX UE. The PC5-RRC connection may include at least one PC5-unicast connection. In step S1620, for example, the TX UE and/or the RX UE may obtain an SL DRX configuration including information related to an SL DRX cycle and information related to a timer for active time. For example, the TX UE may transmit an SL DRX configuration to the RX UE based on a PC5-RRC connection or the like. For example, the RX UE may perform an SL DRX operation based on the timer for active time. For example, the timer for active time may include at least one of an SL DRX on-duration timer or an SL DRX inactivity timer. For example, a time during which the SL DRX on-duration timer is running or a time during which the SL DRX inactivity timer is running may be a time included in an active time of the RX UE. In S1630, for example, the RX UE may start the timer for active time. In step S1640, for example, the RX UE may perform an SL DRX operation based on the timer for active time. For example, the RX UE may receive/monitor a transport block (TB) (e.g., or a MAC PDU) (e.g., reception/monitoring of PSCCH/PSSCH) within the active time. For example, the RX UE may not receive/monitor a TB (e.g., or a MAC PDU) during a time other than the active time (e.g., reception/monitoring of PSCCH/PSSCH).

In step S1650, for example, the TX UE may start/trigger SL DRX command MAC CE reporting related to the PC5-RRC connection. In step S1660, for example, the TX UE and/or the RX UE may detect a request for an MAC reset related to the PC5-RRC connection. In step S1670, for example, if the timer for active time is running, and upon receiving an MAC reset related to the PC5-RRC connection, the RX UE may stop the timer for active time (e.g., a timer related to the PC5-RRC connection (e.g., DRX on-duration timer, a DRX inactivity timer)). In step S1672, for example, upon receiving a request for an MAC reset related to the PC5-RRC connection, the RX UE may stop receiving/monitoring a TB (e.g., or a MAC PDU) (e.g., reception/monitoring of PSCCH/PSSCH). And, in step S1680, for example, an SL DRX command MAC CE reporting procedure of the TX UE may be canceled in relation to the request for a MAC reset. For example, the TX UE may not transmit an SL DRX command MAC CE related to a specific PC5-RRC connection to the RX UE. Accordingly, the timer for active time of the RX UE may be kept from unnecessarily additionally stopping.

An embodiment of the present disclosure may have various advantageous effects. For example, according to an embodiment of the present disclosure, since a UE's DRX command MAC CE reporting procedure is canceled based on a MAC reset, it is possible to solve the problem of unnecessarily generating and/or signaling a DRX command MAC CE even if the UE receives a request for a sidelink interface MAC reset. For example, according to an embodiment of the present disclosure, signaling overhead caused by the DRX command MAC CE may be reduced. According to an embodiment of the present disclosure, for example, after a sidelink interface MAC reset related to a specific PC5-RRC connection has occurred, a DRX timer not related to the specific PC5-RRC connection may be kept from stopping due to an unnecessary DRX command MAC CE. According to an embodiment of the present disclosure, for example, after a sidelink interface MAC reset related to a specific PC5-RRC connection has occurred, a DRX timer related to the specific PC5-RRC connection may be kept from stopping additionally due to an unnecessary DRX command MAC CE.

In addition, an on-duration mentioned in the proposal of the present disclosure can be extended and interpreted as an active time period (e.g., time to wake-up state (e.g., RF module turned on) to receive/transmit radio signals), an off-duration may be extended and interpreted as a sleep time (e.g., a time for operating in a sleep mode state (e.g., a state in which an RF module is turned off) for power saving). It does not mean that a TX UE is obligated to operate in a sleep mode in a sleep time interval. If necessary, a TX UE may be allowed to operate in an active time for a while for a sensing operation and/or a transmission operation even in sleep time.

For example, whether the (part of) proposed method/rule of the present disclosure is applied and/or a related parameter (e.g., threshold) may be configured specifically (or differently or independently) for a resource pool. For example, whether the (part of) proposed method/rule of the present disclosure is applied and/or a related parameter (e.g., threshold) may be configured specifically (or differently or independently) for congestion level. For example, whether the (part of) proposed method/rule of the present disclosure is applied and/or a related parameter (e.g., threshold) may be configured specifically (or differently or independently) for a priority of a service. For example, whether the (part of) proposed method/rule of the present disclosure is applied and/or a related parameter (e.g., threshold) may be configured specifically (or differently or independently) for a service type. For example, whether the (part of) proposed method/rule of the present disclosure is applied and/or a related parameter (e.g., threshold) may be configured specifically (or differently or independently) for a QoS requirement (e.g., latency, reliability). For example, whether the (part of) proposed method/rule of the present disclosure is applied and/or a related parameter (e.g., threshold) may be configured specifically (or differently or independently) for PQI (5QI (5G QoS identifier) for PC5). For example, whether the (part of) proposed method/rule of the present disclosure is applied and/or a related parameter (e.g., threshold) may be configured specifically (or differently or independently) for a traffic type (e.g., a periodic generation or a aperiodic generation). For example, whether the (part of) proposed method/rule of the present disclosure is applied and/or a related parameter (e.g., threshold) may be configured specifically (or differently or independently) for an SL transmission resource allocation mode (e.g., mode 1 or mode 2).

For example, whether the proposed rule of the present disclosure is applied and/or related parameter setting values may be configured specifically (or differently or independently) for a resource pool. For example, whether the proposed rule of the present disclosure is applied and/or related parameter setting values may be configured specifically (or differently or independently) for a type of service/packet. For example, whether the proposed rule of the present disclosure is applied and/or related parameter setting values may be configured specifically (or differently or independently) for a priority of service/packet. For example, whether the proposed rule of the present disclosure is applied and/or related parameter setting values may be configured specifically (or differently or independently) for QoS requirements (e.g., URLLC/EMBB traffic, reliability, latency). For example, whether the proposed rule of the present disclosure is applied and/or related parameter setting values may be configured specifically (or differently or independently) for PQI. For example, whether the proposed rule of the present disclosure is applied and/or related parameter setting values may be configured specifically (or differently or independently) for a cast type (e.g., unicast, groupcast, broadcast). For example, whether the proposed rule of the present disclosure is applied and/or related parameter setting values may be configured specifically (or differently or independently) for (resource pool) congestion level (e.g., CBR). For example, whether the proposed rule of the present disclosure is applied and/or related parameter setting values may be configured specifically (or differently or independently) for SL HARQ feedback scheme (e.g., NACK-only feedback, ACK/NACK feedback). For example, whether the proposed rule of the present disclosure is applied and/or related parameter setting values may be configured specifically (or differently or independently) for HARQ Feedback Enabled MAC PDU transmission. For example, whether the proposed rule of the present disclosure is applied and/or related parameter setting values may be configured specifically (or differently or independently) for HARQ Feedback Disabled MAC PDU transmission. For example, whether the proposed rule of the present disclosure is applied and/or related parameter setting values may be configured specifically (or differently or independently) for whether PUCCH-based SL HARQ feedback reporting operation is set. For example, whether the proposed rule of the present disclosure is applied and/or related parameter setting values may be configured specifically (or differently or independently) for a resource reselection based on pre-emption or pre-emption. For example, whether the proposed rule of the present disclosure is applied and/or related parameter setting values may be configured specifically (or differently or independently) for a re-evaluation or re-selection of resources based on re-evaluation.

For example, whether the proposed rule of the present disclosure is applied and/or related parameter setting values may be configured specifically (or differently or independently) for (L2 or L1) (source and/or destination) identifier. For example, whether the proposed rule of the present disclosure is applied and/or related parameter setting values may be configured specifically (or differently or independently) for (L2 or L1) (Combination of Source ID and Destination ID) Identifier. For example, whether the proposed rule of the present disclosure is applied and/or related parameter setting values may be configured specifically (or differently or independently) for (L2 or L1) (a combination of source ID and destination ID pair and cast type) identifier. For example, whether the proposed rule of the present disclosure is applied and/or related parameter setting values may be configured specifically (or differently or independently) for the direction of a pair of source layer ID and destination layer ID. For example, whether the proposed rule of the present disclosure is applied and/or related parameter setting values may be configured specifically (or differently or independently) for PC5 RRC connection/link. For example, whether the proposed rule of the present disclosure is applied and/or related parameter setting values may be configured specifically (or differently or independently) for the case of performing SL DRX. For example, whether the proposed rule of the present disclosure is applied and/or related parameter setting values may be configured specifically (or differently or independently) for SL mode type (e.g., resource allocation mode 1 or resource allocation mode 2). For example, whether the proposed rule of the present disclosure is applied and/or related parameter setting values may be configured specifically (or differently or independently) for a case of performing (a) periodic resource reservation.

The certain time referred to in the proposal of the present disclosure may refer to a time during which a UE operates as an active time for a predefined time in order to receive a sidelink signal or sidelink data from a counterpart UE. A certain time referred to in the proposal of the present disclosure may refer to a time during which a UE operates as an active time for a specific timer (e.g., a sidelink DRX retransmission timer, a sidelink DRX inactivity timer, or a timer that guarantees operation as active time in DRX operation of an RX UE) time in order to receive a sidelink signal or sidelink data from a counterpart UE. In addition, whether the proposal and proposal rule of the present disclosure are applied (and/or related parameter setting values) may also be applied to mmWave SL operation.

Figure 17:
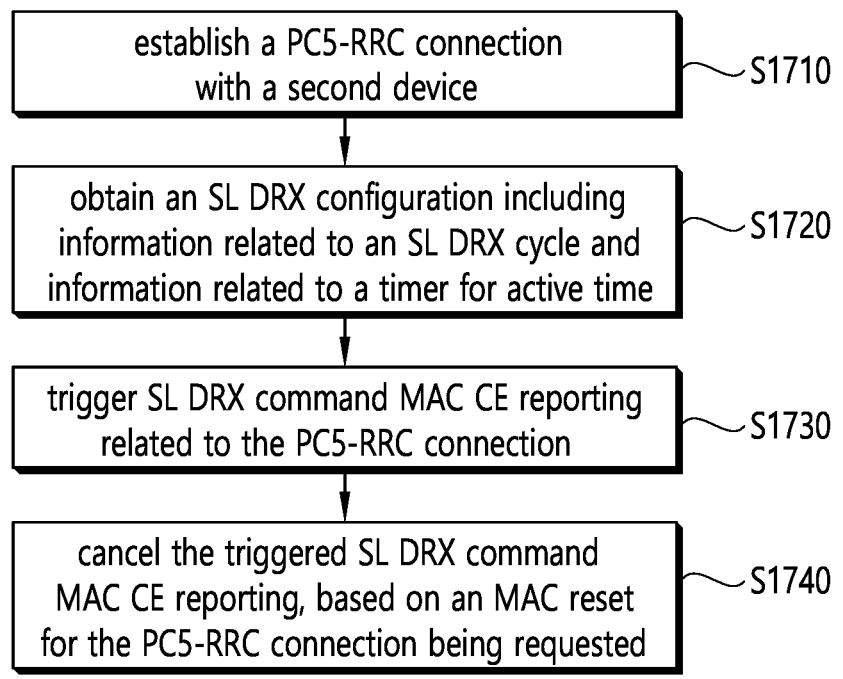
FIG. 17 shows a method for performing wireless communication by a first device, based on an embodiment of the present disclosure.

FIG. 17 shows a method for performing wireless communication by a first device, based on an embodiment of the present disclosure. The embodiment of FIG. 17 may be combined with various embodiments of the present disclosure.

Referring to FIG. 17, in step S1710, for example, the first device may establish a PC5-RRC connection with a second device. In step S1720, for example, the first device may determine a selection window. In step S1730, for example, the first device may obtain an SL DRX configuration including information related to an SL DRX cycle and information related to a timer for active time. For example, the timer for active time may include at least one of an SL DRX on-duration timer or an SL DRX inactivity timer. For example, a time during which the SL DRX on-duration timer is running or a time during which the SL DRX inactivity timer is running may be a time included in an activity time of the second device. For example, the first device may trigger SL DRX command MAC CE reporting related to the PC5-RRC connection. For example, the SL DRX command MAC CE may be information for stopping at least one of the SL DRX on-duration timer or the SL DRX inactivity timer. For example, the SL DRX command MAC CE may be information for keeping the second device from monitoring PSCCH before the next SL DRX cycle.

Additionally or alternatively, the PC5-RRC connection may include at least one PC5-unicast link.

Additionally or alternatively, the MAC reset for the PC5-RRC connection may include a MAC reset related to one of the at least one PC5-unicast link.

Additionally or alternatively, the triggered SL DRX command MAC CE reporting may be canceled, based on the MAC reset related to the one PC5-unicast link being requested.

Additionally or alternatively, the MAC reset related to the one PC5-unicast link may include a sidelink-specific MAC reset related to the one PC5-unicast link.

Additionally or alternatively, the triggered SL DRX command MAC CE reporting may be canceled, based on the sidelink-specific MAC reset related to the one PC5-unicast link being requested.

Additionally or alternatively, SL DRX command MAC CE reporting related to the one PC5-unicast link may be triggered during the PC5-RRC connection.

Additionally or alternatively, the triggered SL DRX command MAC CE reporting and the SL DRX command MAC CE reporting related to the at least one PC5-unicast link may be canceled, based on a MAC reset related to the one PC5-unicast link being requested.

Additionally or alternatively, the first device may trigger reporting related to SL IUC (inter-UE coordination) information.

Additionally or alternatively, the first device may cancel the reporting related to the SL IUC information, based on the MAC reset for the PC5-RRC connection being requested.

Additionally or alternatively, the first device may trigger reporting related to SL CSI (channel state information) related to the PC5-RRC connection.

Additionally or alternatively, the first device may cancel the reporting related to the SL CSI, based on the MAC reset for the PC5-RRC connection being requested.

Additionally or alternatively, the first device may trigger reporting related to an SL buffer status.

Additionally or alternatively, the first device may cancel the reporting related to the SL buffer status, based on the MAC reset for the PC5-RRC connection being requested.

Additionally or alternatively, the first device may trigger a scheduling request related to at least one resource.

Additionally or alternatively, the first device may cancel the scheduling request related to at least one resource, based on the MAC reset for the PC5-RRC connection being requested.

Additionally or alternatively, the first device may start the timer (i) for the active time and (ii) related to the PC5-RRC connection.

Additionally or alternatively, the first device may stop the timer for the active time, based on the MAC reset for the PC5-RRC connection being requested and based on the running of the timer for the active time.

Additionally or alternatively, the timer for the active time running within the SL DRX cycle may be stopped before the beginning of the next SL DRX cycle following the above SL DRX cycle.

Additionally or alternatively, an LBT (listen before talk) counter may be reset, based on the MAC reset for the PC5-RRC connection being requested.

Additionally or alternatively, the MAC reset may be requested based on at least one of an SL RLF (radio link failure) or an LBT (listen before talk) failure or a request from an upper layer.

Additionally or alternatively, the LBT counter may be a variable used to detect the LBT failure.

Additionally or alternatively, an LCP (logical channel prioritization) counter for each logical channel related to the PC5-RRC connection may be initialized to 0, based on the MAC reset for the PC5-RRC connection being requested.

Additionally or alternatively, the LCP counter may be maintained for the each logical channel.

Additionally or alternatively, the LCP counter may be a variable used for an LCP for the each logical channel.

Additionally or alternatively, the PC5-RRC connection may include (i) a first ID for the first device and (ii) a first PC5-RRC connection related to a second ID for the second device.

Additionally or alternatively, the first device may start the timer for the active time set based on the first ID.

Additionally or alternatively, the first device may stop the timer for the active time set based on the first ID, based on the MAC reset for the first PC5-RRC connection being requested and based on the running of the timer for the active time set based on the first ID.

Additionally or alternatively, the SL DRX cycle may be set based on the first ID.

Additionally or alternatively, the timer for the active time running within the SL DRX cycle may be stopped before the beginning of the next SL DRX cycle following the above SL DRX cycle.

The method proposed above may be applied to a device according to various embodiments of the present disclosure. First, a processor 102 of a first device 100 may execute instructions (e.g., control a transceiver 106) to establish a PC5-RRC (radio resource control) connection with a second device. For example, the processor 102 of the first device 100 may execute instructions (e.g., control a transceiver 106) to obtain an SL DRX configuration including information related to an SL (sidelink) DRX (discontinuous) cycle and information related to a timer for active time. For example, the timer for active time may be at least one of an on-duration timer or an SL DRX inactivity timer. For example, a time during which the SL DRX on-duration timer is running or a time during which the SL DRX inactivity timer is running may be a time included in an active time of the second device. For example, the processor 102 of the first device 100 may execute instructions to trigger SL DRX command MAC (medium access control) CE (control element) reporting related to the PC5-RRC connection. For example, the processor 102 of the first device 100 may execute the instructions to cancel the triggered SL DRX command MAC CE reporting, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second device from monitoring PSCCH (physical sidelink control channel) before the next SL DRX cycle.

According to an embodiment of the present disclosure, a first device for performing wireless communication may be provided. The first device may include: one or more memories storing instructions; one or more transceivers; and one or more processors connected to the one or more memories and the one or more transceivers, wherein the one or more processors may execute the instructions to establish a PC5-RRC (radio resource control) connection with a second device. For example, the one or more processors may execute the instructions to obtain an SL DRX configuration including information related to an SL (sidelink) DRX (discontinuous) cycle and information related to a timer for active time. For example, the timer for active time may be at least one of an on-duration timer or an SL DRX inactivity timer. For example, a time during which the SL DRX on-duration timer is running or a time during which the SL DRX inactivity timer is running may be a time included in an active time of the second device. For example, the one or more processors may execute the instructions to trigger SL DRX command MAC (medium access control) CE (control element) reporting related to the PC5-RRC connection. For example, the one or more processors may execute the instructions to cancel the triggered SL DRX command MAC CE reporting, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second device from monitoring PSCCH (physical sidelink control channel) before the next SL DRX cycle.

According to an embodiment of the present disclosure, an apparatus configured to control a first UE may be provided. The apparatus may include: one or more processors; and one or more memories that are operably connected by the one or more processors and store instructions, wherein the one or more processors may execute the instructions to establish a PC5-RRC (radio resource control) connection with a second UE. For example, the one or more processors may execute the instructions to obtain an SL DRX configuration including information related to an SL (sidelink) DRX (discontinuous) cycle and information related to a timer for active time. For example, the timer for active time may be at least one of an on-duration timer or an SL DRX inactivity timer. For example, a time during which the SL DRX on-duration timer is running or a time during which the SL DRX inactivity timer is running may be a time included in an active time of the second UE. For example, the one or more processors may execute the instructions to trigger SL DRX command MAC (medium access control) CE (control element) reporting related to the PC5-RRC connection. For example, the one or more processors may execute the instructions to cancel the triggered SL DRX command MAC CE reporting, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second UE from monitoring PSCCH (physical sidelink control channel) before the next SL DRX cycle.

According to an embodiment of the present disclosure, a non-transitory computer-readable storage medium that stores instructions may be provided. When the instructions are executed by one or more processors, the one or more processors may cause a first device to establish a PC5-RRC (radio resource control) connection with a second device. For example, when the instructions are executed by one or more processors, the one or more processors may cause the first device to obtain an SL DRX configuration including information related to an SL (sidelink) DRX (discontinuous) cycle and information related to a timer for active time. For example, the timer for active time may be at least one of an on-duration timer or an SL DRX inactivity timer. For example, a time during which the SL DRX on-duration timer is running or a time during which the SL DRX inactivity timer is running may be a time included in an active time of the second device. For example, when the instructions are executed by one or more processors, the one or more processors may cause the first device to trigger SL DRX command MAC (medium access control) CE (control element) reporting related to the PC5-RRC connection. For example, when the instructions are executed by one or more processors, the one or more processors may cause the first device to cancel the triggered SL DRX command MAC CE reporting, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second device from monitoring PSCCH (physical sidelink control channel) before the next SL DRX cycle.

Figure 18:
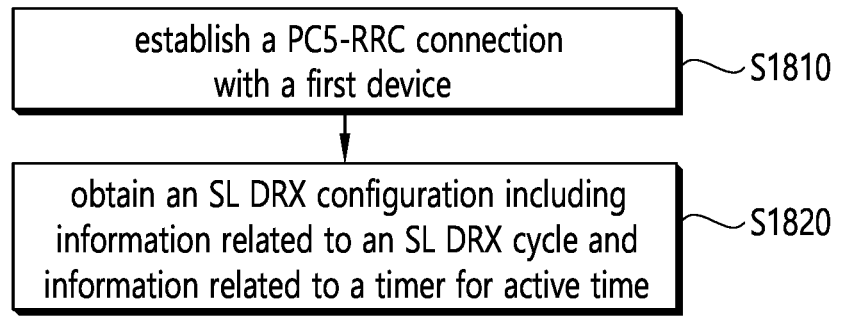
FIG. 18 shows a method for performing wireless communication by a second device, based on an embodiment of the present disclosure.

FIG. 18 shows a method for performing wireless communication by a second device according to an embodiment of the present disclosure. The embodiment of FIG. 18 may be combined with various embodiments of the present disclosure.

Referring to FIG. 18, in step S1810, for example, the second device may establish a PC5-RRC connection with a first device. In step S1820, the second device may obtain an SL DRX configuration including information related to an SL DRX cycle and information related to a timer for active time. For example, the timer for active time may include at least one of an SL DRX on-duration timer or an SL DRX inactivity timer. For example, a time during which the SL DRX on-duration timer is running or a time during which the SL DRX inactivity timer is running may be a time included in an activity time of the second device. For example, SL DRX command MAC (medium access control) CE (control element) reporting related to the PC5-RRC connection may be triggered. For example, the triggered SL DRX command MAC CE reporting may be canceled, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second device from monitoring PSCCH before the next SL DRX cycle.

Additionally or alternatively, the PC5-RRC connection may include at least one PC5-unicast link.

Additionally or alternatively, the MAC reset for the PC5-RRC connection may include a MAC reset related to one of the at least one PC5-unicast link.

Additionally or alternatively, the triggered SL DRX command MAC CE reporting may be canceled, based on the MAC reset related to the one PC5-unicast link being requested.

Additionally or alternatively, the MAC reset related to the one PC5-unicast link may include a sidelink-specific MAC reset related to the one PC5-unicast link.

Additionally or alternatively, the triggered SL DRX command MAC CE reporting may be canceled, based on the sidelink-specific MAC reset related to the one PC5-unicast link being requested.

Additionally or alternatively, SL DRX command MAC CE reporting related to the one PC5-unicast link may be triggered during the PC5-RRC connection.

Additionally or alternatively, the triggered SL DRX command MAC CE reporting and the SL DRX command MAC CE reporting related to the at least one PC5-unicast link may be canceled, based on a MAC reset related to the one PC5-unicast link being requested.

Additionally or alternatively, reporting related to SL IUC (inter-UE coordination) information may be triggered.

Additionally or alternatively, the reporting related to the SL IUC information may be canceled, based on the MAC reset for the PC5-RRC connection being requested.

Additionally or alternatively, reporting related to SL CSI (channel state information) related to the PC5-RRC connection may be triggered.

Additionally or alternatively, the reporting related to the SL CSI may be canceled, based on the MAC reset for the PC5-RRC connection being requested.

Additionally or alternatively, reporting related to an SL buffer status may be triggered.

Additionally or alternatively, the reporting related to the SL buffer status may be canceled, based on the MAC reset for the PC5-RRC connection being requested.

Additionally or alternatively, a scheduling request related to at least one resource may be triggered.

Additionally or alternatively, the scheduling request related to at least one resource may be canceled, based on the MAC reset for the PC5-RRC connection being requested.

Additionally or alternatively, the timer for the active time and related to the PC5-RRC connection may be started.

Additionally or alternatively, the timer for the active time may be stopped, based on the MAC reset for the first PC5-RRC connection being requested and based on the running of the timer for the active time.

Additionally or alternatively, the timer for the active time running within the SL DRX cycle may be stopped before the beginning of the next SL DRX cycle following the above SL DRX cycle.

Additionally or alternatively, the first device may reset an LBT (listen before talk) counter, based on the MAC reset for the PC5-RRC connection being requested.

Additionally or alternatively, the MAC reset may be requested based on at least one of an SL RLF (radio link failure) or an LBT (listen before talk) failure or a request from an upper layer.

Additionally or alternatively, the LBT counter may be a variable used to detect the LBT failure.

Additionally or alternatively, the first device may initialize an LCP (logical channel prioritization) counter for each logical channel related to the PC5-RRC connection to 0, based on the MAC reset for the PC5-RRC connection being requested.

Additionally or alternatively, the LCP counter may be maintained for the each logical channel.

Additionally or alternatively, the LCP counter may be a variable used for an LCP for the each logical channel.

Additionally or alternatively, the PC5-RRC connection may include (i) a first ID for the first device and (ii) a first PC5-RRC connection related to a second ID for the second device.

Additionally or alternatively, the timer for the active time set based on the first ID may be started.

Additionally or alternatively, the timer for the active time set based on the first ID may be stopped, based on the MAC reset for the first PC5-RRC connection being requested and based on the running of the timer for the active time based on the first ID.

Additionally or alternatively, the SL DRX cycle may be set based on the first ID.

Additionally or alternatively, the timer for the active time running within the SL DRX cycle may be stopped before the beginning of the next SL DRX cycle following the above SL DRX cycle.

The method proposed above may be applied to a device according to various embodiments of the present disclosure. First, a processor 202 of a second device 200 may establish a PC5-RRC (radio resource control) connection with a first device (e.g., by controlling a transceiver 206). For example, the processor 202 of the second device 200 may obtain an SL DRX configuration including information related to an SL (sidelink) DRX (discontinuous) cycle and information related to a timer for active time (e.g., by controlling the transceiver 206). For example, the timer for active time may include at least one of an on-duration timer or an SL DRX inactivity timer. For example, a time during which the SL DRX on-duration timer is running or a time during which the SL DRX inactivity timer is running may be a time included in an active time of the second device. For example, SL DRX command MAC (medium access control) CE (control element) reporting related to the PC5-RRC connection may be triggered. For example, the triggered SL DRX command MAC CE reporting may be canceled, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second device from monitoring PSCCH (physical sidelink control channel) before the next SL DRX cycle.

According to an embodiment of the present disclosure, a second device for performing wireless communication may be provided. The second device may include: one or more memories storing instructions; one or more transceivers; and one or more processors connected to the one or more memories and the one or more transceivers, wherein the one or more processors may execute the instructions to establish a PC5-RRC (radio resource control) connection with a first device. For example, the one or more processors may execute the instructions to obtain an SL DRX configuration including information related to an SL (sidelink) DRX (discontinuous) cycle and information related to a timer for active time. For example, the timer for active time may include at least one of an on-duration timer or an SL DRX inactivity timer. For example, a time during which the SL DRX on-duration timer is running or a time during which the SL DRX inactivity timer is running may be a time included in an active time of the second device. For example, SL DRX command MAC (medium access control) CE (control element) reporting related to the PC5-RRC connection may be triggered. For example, the triggered SL DRX command MAC CE reporting may be canceled, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second device from monitoring PSCCH (physical sidelink control channel) before the next SL DRX cycle.

According to an embodiment of the present disclosure, an apparatus configured to control a second UE may be provided. The apparatus may include: one or more processors; and one or more memories that are operably connected by the one or more processors and store instructions, wherein the one or more processors may execute the instructions to establish a PC5-RRC (radio resource control) connection with a first UE. For example, the one or more processors may execute the instructions to obtain an SL DRX configuration including information related to an SL (sidelink) DRX (discontinuous) cycle and information related to a timer for active time. For example, the timer for active time may include at least one of an on-duration timer or an SL DRX inactivity timer. For example, a time during which the SL DRX on-duration timer is running or a time during which the SL DRX inactivity timer is running may be a time included in an active time of the second UE. For example, SL DRX command MAC (medium access control) CE (control element) reporting related to the PC5-RRC connection may be triggered. For example, the triggered SL DRX command MAC CE reporting may be canceled, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second UE from monitoring PSCCH (physical sidelink control channel) before the next SL DRX cycle.

According to an embodiment of the present disclosure, a non-transitory computer-readable storage medium that stores instructions may be provided. When the instructions are executed by one or more processors, the one or more processors may cause a second device to establish a PC5-RRC (radio resource control) connection. For example, when the instructions are executed by one or more processors, the one or more processors may cause the second device to obtain an SL DRX configuration including information related to an SL (sidelink) DRX (discontinuous) cycle and information related to a timer for active time. For example, the timer for active time may include at least one of an on-duration timer or an SL DRX inactivity timer. For example, a time during which the SL DRX on-duration timer is running or a time during which the SL DRX inactivity timer is running may be a time included in an active time of the second device. For example, SL DRX command MAC (medium access control) CE (control element) reporting related to the PC5-RRC connection may be triggered. For example, the triggered SL DRX command MAC CE reporting may be canceled, based on an MAC reset for the PC5-RRC connection being requested. For example, the SL DRX command MAC CE may be information for stopping at least one of the SL DRX on-duration timer or the SL DRX inactivity timer. For example, the SL DRX command MAC CE may be information for keeping the second device from monitoring PSCCH (physical sidelink control channel) before the next SL DRX cycle.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
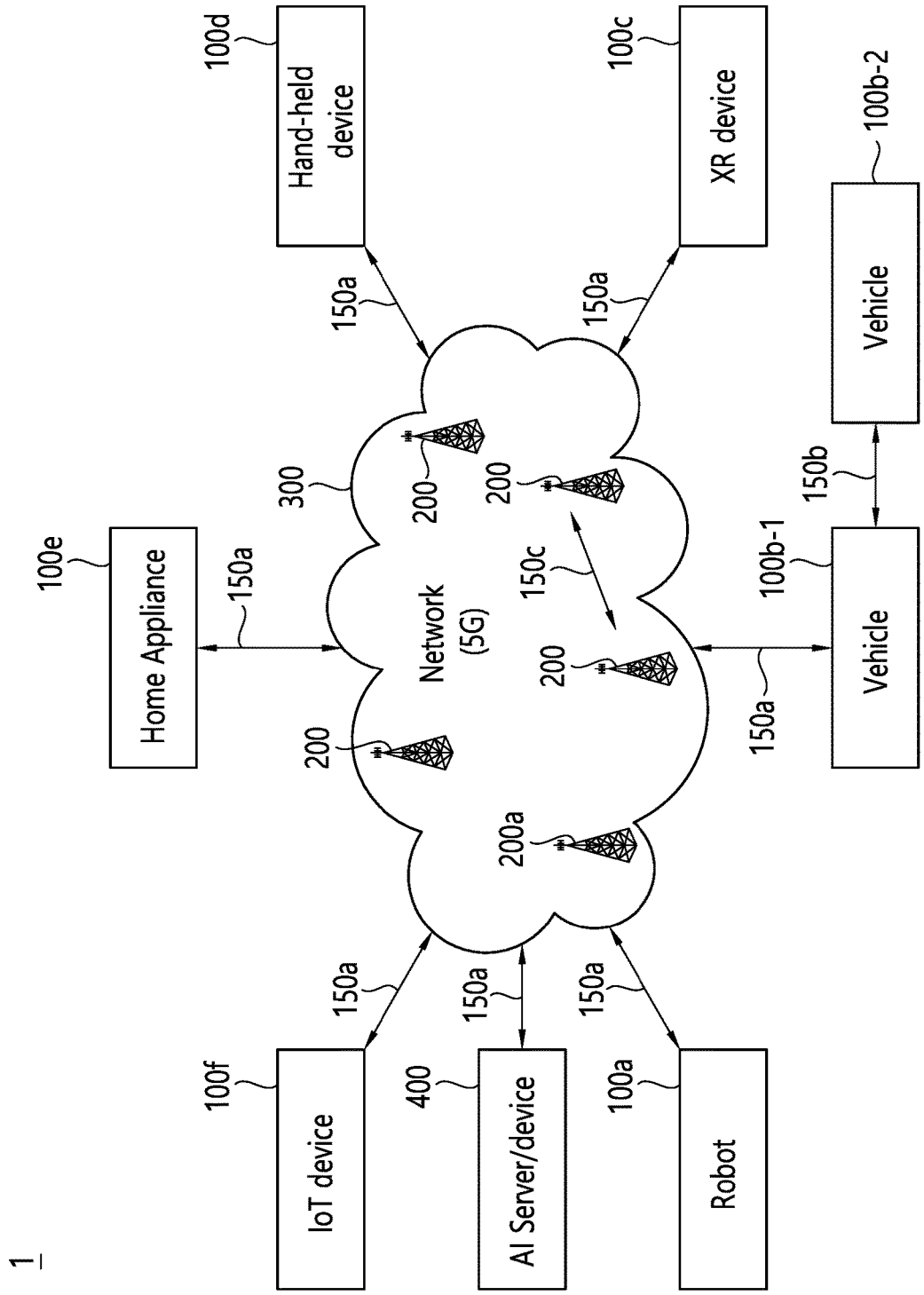
FIG. 19 shows a communication system 1, based on an embodiment of the present disclosure.

FIG. 19 shows a communication system 1, based on an embodiment of the present disclosure. The embodiment of FIG. 19 may be combined with various embodiments of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT)

device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
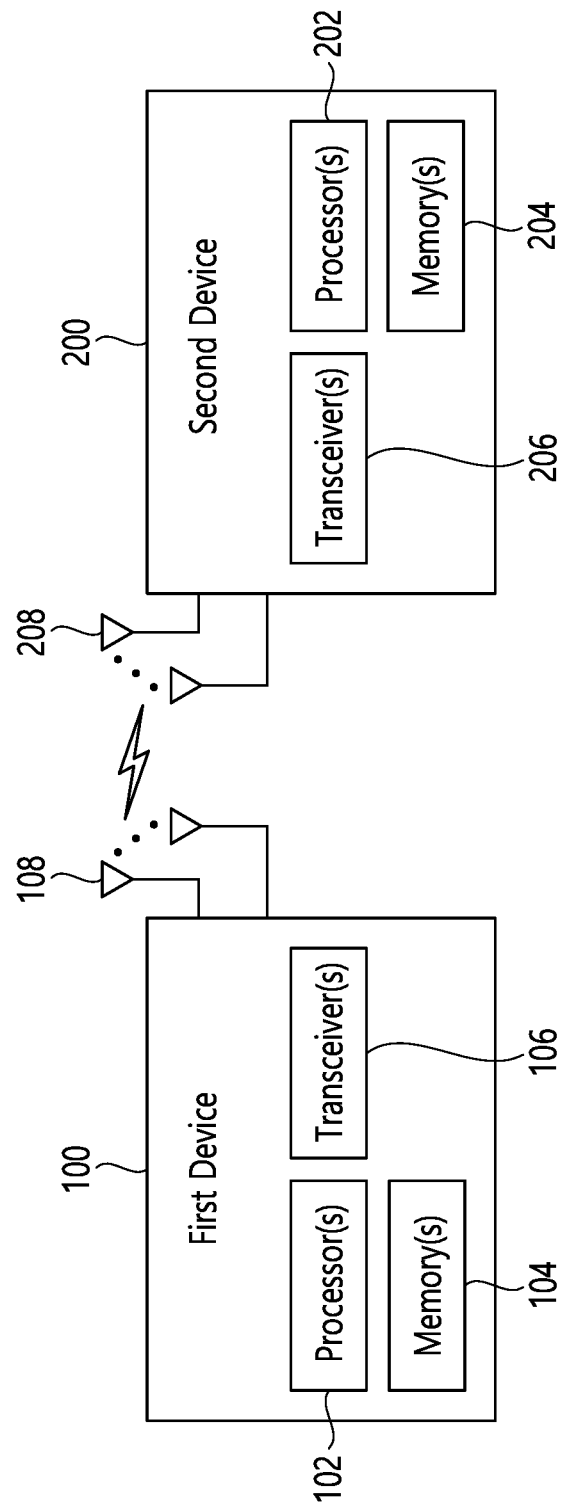
FIG. 20 shows wireless devices, based on an embodiment of the present disclosure.

FIG. 20 shows wireless devices, based on an embodiment of the present disclosure. The embodiment of FIG. 20 may be combined with various embodiments of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and obtain the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
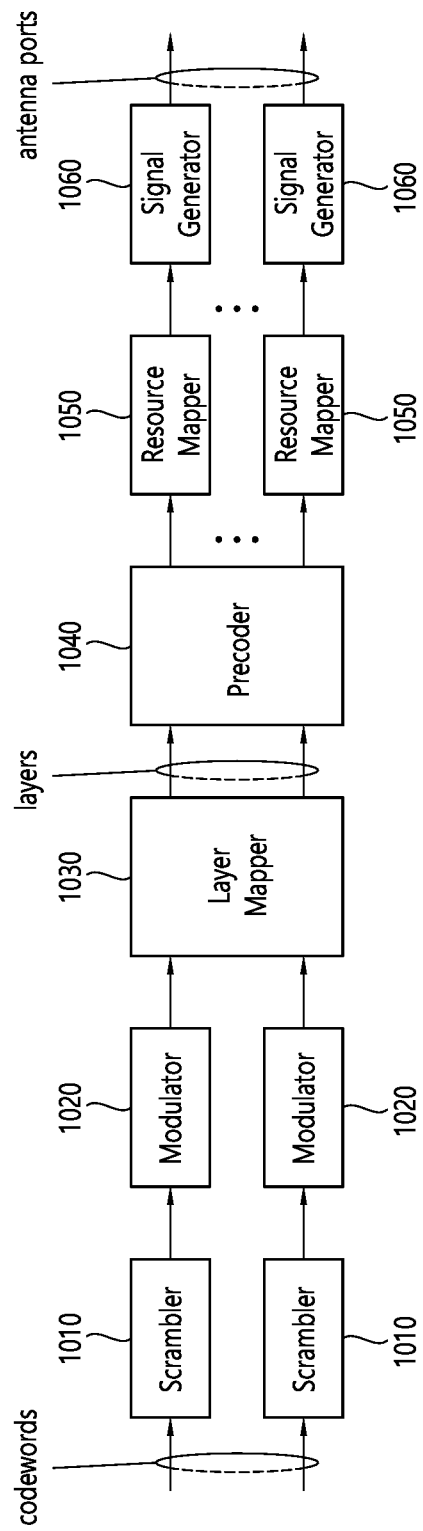
FIG. 21 shows a signal process circuit for a transmission signal, based on an embodiment of the present disclosure.

FIG. 21 shows a signal process circuit for a transmission signal, based on an embodiment of the present disclosure. The embodiment of FIG. 21 may be combined with various embodiments of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
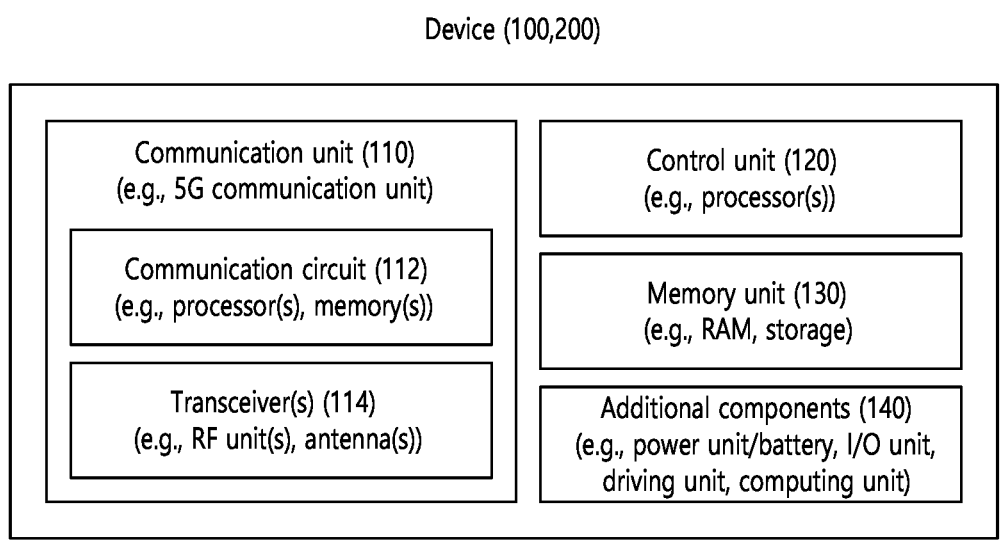
FIG. 22 shows another example of a wireless device, based on an embodiment of the present disclosure.

FIG. 22 shows another example of a wireless device, based on an embodiment of the present disclosure. The wireless device may be implemented in various forms according to a use-case/service (refer to FIG. 19). The embodiment of FIG. 22 may be combined with various embodiments of the present disclosure.

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 19), the vehicles (100*b*-1 and 100*b*-2 of FIG. 19), the XR device (100*c* of FIG. 19), the hand-held device (100*d* of FIG. 19), the home appliance (100*e* of FIG. 19), the IoT device (100*f* of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
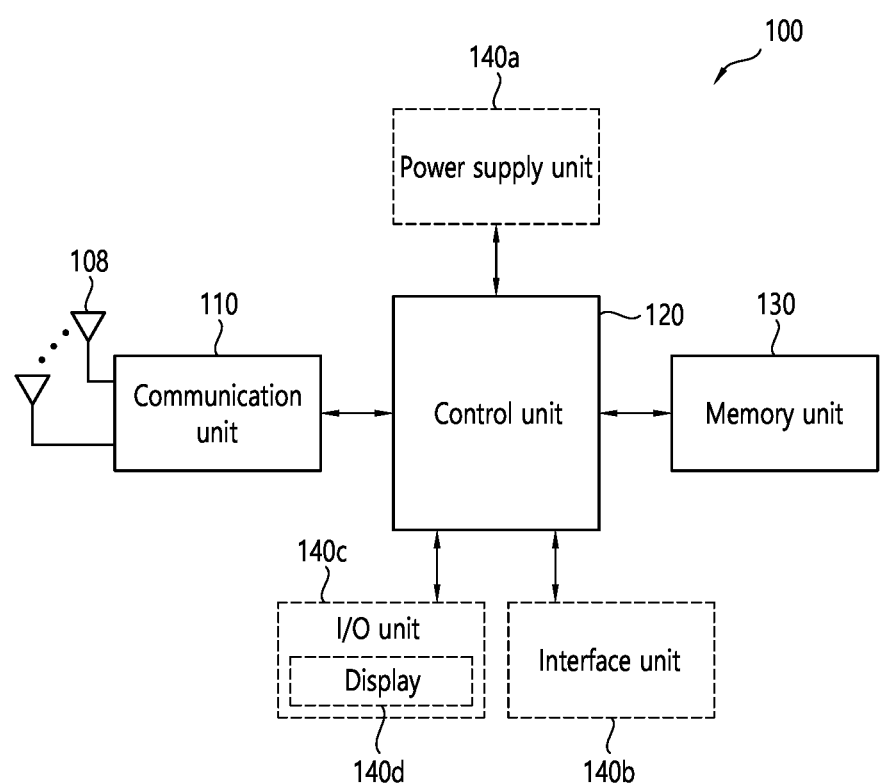
FIG. 23 shows a hand-held device, based on an embodiment of the present disclosure.

FIG. 23 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 23 may be combined with various embodiments of the present disclosure.

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may obtain information/signals (e.g., touch, text, voice, images, or video) input by a user and the obtained information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 24 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 24 may be combined with various embodiments of the present disclosure.

Referring to FIG. 24, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may obtain a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically obtain recent traffic information data from the external server and obtain surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    establishing a PC5-RRC (radio resource control) connection with a second device;
    obtaining an SL DRX configuration including information related to an SL (sidelink) DRX (discontinuous) cycle and information related to a timer for active time, wherein the timer for active time includes at least one of an SL DRX on-duration timer or an SL DRX inactivity timer, and
    wherein a time during which the SL DRX on-duration timer is running or a time during which the SL DRX inactivity timer is running is a time included in an active time of the second device;
    triggering SL DRX command MAC (medium access control) CE (control element) reporting related to the PC5-RRC connection; and
    canceling the triggered SL DRX command MAC CE reporting, based on an MAC reset for the PC5-RRC connection being requested,
    wherein the SL DRX command MAC CE is information for stopping at least one of the SL DRX on-duration timer or the SL DRX inactivity time, and
    wherein the SL DRX command MAC CE is information for keeping the second device from monitoring PSCCH (physical sidelink control channel) before a next SL DRX cycle.

2. The method of claim 1, wherein the PC5-RRC connection includes at least one PC5-unicast link.

3. The method of claim 2, wherein the MAC reset for the PC5-RRC connection includes a MAC reset related to one of the at least one PC5-unicast link, and
    wherein the triggered SL DRX command MAC CE reporting is canceled, based on the MAC reset related to the one PC5-unicast link being requested.

4. The method of claim 3, wherein the MAC reset related to the one PC5-unicast link includes a sidelink-specific MAC reset related to the one PC5-unicast link, and
    wherein the triggered SL DRX command MAC CE reporting is canceled, based on the sidelink-specific MAC reset related to the one PC5-unicast link being requested.

5. The method of claim 3, wherein SL DRX command MAC CE reporting related to the one PC5-unicast link is triggered during the PC5-RRC connection, and
    wherein the triggered SL DRX command MAC CE reporting and the SL DRX command MAC CE reporting related to the at least one PC5-unicast link are canceled, based on a MAC reset related to the one PC5-unicast link being requested.

6. The method of claim 1, further comprising:
    triggering reporting related to SL IUC (inter-UE coordination) information; and
    canceling the reporting related to the SL IUC information, based on the MAC reset for the PC5-RRC connection being requested.

7. The method of claim 1, further comprising:
    triggering reporting related to SL CSI (channel state information) related to the PC5-RRC connection; and
    canceling the reporting related to the SL CSI, based on the MAC reset for the PC5-RRC connection being requested.

8. The method of claim 1, further comprising:
    triggering reporting related to an SL buffer status; and
    canceling the reporting related to the SL buffer status, based on the MAC reset for the PC5-RRC connection being requested.

9. The method of claim 1, further comprising:
    triggering a scheduling request related to at least one resource,
    canceling the scheduling request related to at least one resource, based on the MAC reset for the PC5-RRC connection being requested.

10. The method of claim 1, further comprising:
    starting the timer for the active time and related to the PC5-RRC connection; and
    stopping the timer for the active time, based on the MAC reset for the PC5-RRC connection being requested and based on the running of the timer for the active time.

11. The method of claim 10, wherein the timer for the active time running within the SL DRX cycle is stopped before the beginning of the next SL DRX cycle following the above SL DRX cycle.

12. The method of claim 1, further comprising resetting an LBT (listen before talk) counter, based on the MAC reset for the PC5-RRC connection being requested,
    wherein the MAC reset is requested based on at least one of an SL RLF (radio link failure) or an LBT (listen before talk) failure or a request from an upper layer, and
    wherein the LBT counter is a variable used to detect the LBT failure.

13. The method of claim 1, further comprising initializing an LCP (logical channel prioritization) counter for each logical channel related to the PC5-RRC connection to 0, based on the MAC reset for the PC5-RRC connection being requested,
    wherein the LCP counter is maintained for the each logical channel, and
    wherein the LCP counter is a variable used for an LCP for the each logical channel.

14. The method of claim 1, wherein the PC5-RRC connection includes (i) a first ID for the first device and (ii) a first PC5-RRC connection related to a second ID for the second device,
    the method further comprising:
    starting the timer for the active time set based on the first ID,
    stopping the timer for the active time set based on the first ID, based on the MAC reset for the first PC5-RRC connection being requested and based on the running of the timer for the active time set based on the first ID.

15. The method of claim 14, wherein the SL DRX cycle is set based on the first ID, and the timer for the active time running within the SL DRX cycle is stopped before the beginning of the next SL DRX cycle following the above SL DRX cycle.

16. A first device for performing wireless communication, the first device comprising:
one or more memories storing instructions;
one or more transceivers; and
one or more processors connected to the one or more memories and the one or more transceivers,
wherein the one or more processors execute the instructions to:
establish a PC5-RRC (radio resource control) connection with a second device and obtain an SL DRX configuration including information related to an SL (sidelink) DRX (discontinuous) cycle and information related to a timer for active time,
wherein the timer for active time is at least one of an on-duration timer or an SL DRX inactivity timer, and
wherein a time during which the SL DRX on-duration timer is running or a time during which the SL DRX inactivity timer is running is a time included in an active time of the second device, and
trigger SL DRX command MAC (medium access control) CE (control element) reporting related to the PC5-RRC connection and cancel the triggered SL DRX command MAC CE reporting, based on an MAC reset for the PC5-RRC connection being requested,
wherein the SL DRX command MAC CE is information for stopping at least one of the SL DRX on-duration timer or the SL DRX inactivity timer, and
wherein the SL DRX command MAC CE is information for keeping the second device from monitoring PSCCH (physical sidelink control channel) before a next SL DRX cycle.

17. The first device of claim 16, wherein the PC5-RRC connection includes at least one PC5-unicast link.

18. The first device of claim 17, wherein the MAC reset for the PC5-RRC connection includes a MAC reset related to one of the at least one PC5-unicast link, and
wherein the triggered SL DRX command MAC CE reporting is canceled, based on the MAC reset related to the one PC5-unicast link being requested.

19. The first device of claim 18, wherein the MAC reset related to the one PC5-unicast link includes a sidelink-specific MAC reset related to the one PC5-unicast link, and
wherein the triggered SL DRX command MAC CE reporting is canceled, based on the sidelink-specific MAC reset related to the one PC5-unicast link being requested.

20. An apparatus configured to control a first UE, the apparatus comprising:
one or more processors; and
one or more memories that are operably connected by the one or more processors and store instructions,
wherein the one or more processors execute the instructions to:
establish a PC5-RRC (radio resource control) connection with a second UE and obtain an SL DRX configuration including information related to an SL (sidelink) DRX 94 (discontinuous) cycle and information related to a timer for active time,
wherein the timer for active time is at least one of an on-duration timer or an SL DRX inactivity timer, and
wherein a time during which the SL DRX on-duration timer is running or a time during which the SL DRX inactivity timer is running is a time included in an active time of the second UE, and
trigger SL DRX command MAC (medium access control) CE (control element) reporting related to the PC5-RRC connection and cancel the triggered SL DRX command MAC CE reporting, based on an MAC reset for the PC5-RRC connection being requested,
wherein the SL DRX command MAC CE is information for stopping at least one of the SL DRX on-duration timer or the SL DRX inactivity timer, and
wherein the SL DRX command MAC CE is information for keeping the second UE from monitoring PSCCH (physical sidelink control channel) before a next SL DRX cycle.

* * * * *